(12) United States Patent
Dubrofsky

(10) Patent No.: US 11,468,509 B2
(45) Date of Patent: Oct. 11, 2022

(54) SYSTEMS AND METHODS FOR TOKENIZED CONTROL OF SMART CONTRACTS

(71) Applicant: Akiva Capital Holdings Inc., North York (CA)

(72) Inventor: Akiva Dubrofsky, Toronto (CA)

(73) Assignee: Akiva Capital Holdings LLC, New York, NY (US)

( * ) Notice: Subject to any disclaimer, the term of this patent is extended or adjusted under 35 U.S.C. 154(b) by 69 days.

(21) Appl. No.: 16/721,067

(22) Filed: Dec. 19, 2019

(65) Prior Publication Data

US 2020/0327609 A1    Oct. 15, 2020

Related U.S. Application Data

(60) Provisional application No. 62/897,589, filed on Sep. 9, 2019, provisional application No. 62/879,187, filed on Jul. 26, 2019, provisional application No. 62/835,801, filed on Apr. 18, 2019, provisional application No. 62/832,145, filed on Apr. 10, 2019.

(51) Int. Cl.
| | |
|---|---|
| *G06Q 40/02* | (2012.01) |
| *G06Q 20/36* | (2012.01) |
| *G06Q 40/06* | (2012.01) |
| *G06Q 20/06* | (2012.01) |

(52) U.S. Cl.
CPC ....... *G06Q 40/025* (2013.01); *G06Q 20/0658* (2013.01); *G06Q 20/3676* (2013.01); *G06Q 20/3678* (2013.01); *G06Q 40/06* (2013.01)

(58) Field of Classification Search
CPC ............. G06Q 40/025; G06Q 20/0658; G06Q 20/3676; G06Q 20/3678; G06Q 40/06

USPC .......................................................... 705/38
See application file for complete search history.

(56) References Cited

U.S. PATENT DOCUMENTS

| | | | |
|---|---|---|---|
| 10,373,129 B1* | 8/2019 | James ................... | H04L 9/3239 |
| 10,373,158 B1* | 8/2019 | James ................... | G06Q 40/04 |
| 10,929,842 B1* | 2/2021 | Arvanaghi ............. | H04L 9/50 |
| 11,139,955 B1* | 10/2021 | So ....................... | G06Q 20/3674 |
| 2003/0144940 A1* | 7/2003 | Kochansky ............ | G06Q 40/06 |
| | | | 705/36 R |

(Continued)

FOREIGN PATENT DOCUMENTS

WO    2018204541 A1    11/2018

OTHER PUBLICATIONS

How to use DAI (Year: 2021).*

(Continued)

*Primary Examiner* — Sara C Hamilton
(74) *Attorney, Agent, or Firm* — Fenwick & West LLP

(57) ABSTRACT

Methods and systems for automatically conducting a continuous forward rate agreement in a cryptocurrency using smart contracts. An obligation object is generated and provided with control of a first smart contract, which may be a collateralized debt position smart contract, and control of a lender amount. The obligation object is executed to update balances for first and second parties until the obligation object is liquidated or terminated. Additional parties may be introduced. Upon liquidation or termination, the obligation object accounts to each of the parties based on their balances, and based on tokens generated to track positions in the obligation object.

21 Claims, 14 Drawing Sheets

(56) References Cited

U.S. PATENT DOCUMENTS

| | | | |
|---|---|---|---|
| 2008/0071664 A1 | 3/2008 | Silverman et al. | |
| 2013/0013489 A1* | 1/2013 | Kremen | G06Q 40/06 705/38 |
| 2016/0234026 A1 | 8/2016 | Wilkins et al. | |
| 2017/0109735 A1 | 4/2017 | Sheng et al. | |
| 2017/0213289 A1* | 7/2017 | Doney | G06Q 40/025 |
| 2017/0232300 A1 | 8/2017 | Tran | |
| 2017/0345011 A1* | 11/2017 | Salami | G06Q 20/10 |
| 2018/0082291 A1 | 3/2018 | Allen et al. | |
| 2018/0089758 A1 | 3/2018 | Stradling et al. | |
| 2019/0080392 A1* | 3/2019 | Youb | G06F 21/64 |
| 2019/0087893 A1* | 3/2019 | Pellew | G06Q 20/3825 |
| 2019/0109713 A1* | 4/2019 | Clark | H04L 9/3239 |
| 2019/0114706 A1* | 4/2019 | Bell | H04L 9/0825 |
| 2019/0311359 A1* | 10/2019 | Fett | H04L 9/3239 |
| 2020/0159851 A1* | 5/2020 | Madhavan | G06F 16/284 |
| 2021/0027369 A1* | 1/2021 | Raheman | G06Q 40/025 |

OTHER PUBLICATIONS

MakerDAO's Multi-Collateral Dai (MCD) System (Year: 2002).*

"Exeum: A Decentralized Financial Platform for Price-Stable Cryptocurrencies," by Jaehyung Lee and Minhyung Cho. Aug. 10, 2018. (Year: 2018).*

"Stable Coins in Crypto Economics from Initial Coin Offerings: From Initial Coin Offerings to Central Bank Digital Currencies," by Marco Dell'Erba. 22 N.Y.U. Journal of Legislative Public Policy. vol. 1. 2019. (Year: 2019).*

"Monetary Stabilization in Cryptocurrencies—Design Approaches and Open Questions," by Ingolf G.A. Pernice; Martin Florian; Sebastion Henningsen; Hermann Elendner; Roman Proskalovich; Bjorn Scheuermann. May 28, 2019. (Year: 2019).*

"Toward a Stable Tokenized Medium of Exchange." Cryptoassets, Legal, Regulatory and Monetary Perspectives, by Alexander Liption. Oxford. 2019. (Year: 2019).*

Balakrishnan, "SwanDAI: Hedging Against the Inherent Risks of DAI", dated Sep. 10, 2019, retrieved from <https://btcmanager.com/swandai-hedging-dai/?q=/swandai-hedging-dai/> [retrieved Dec. 18, 2019], 4 pages.

Belyakov, "Getting FIXED interest rate for DAI", dated Nov. 6, 2019, retrieved from <https://medium.com/opium-network/getting-fixed-interest-rate-for-dai-bbc4a5cea9b> [retrieved Dec. 18, 2019], 9 pages.

Berenzon, "Synthetic Assets in DeFi: Use Cases & Opportunities", dated Sep. 6, 2019, retrieved from <https://defiprime.com/synthetic-assets-defi#stability-fee-swaps> [retrieved Dec. 18, 2019], 16 pages.

Bertram, "Cherry Swap", ETHBerlinZwei, Aug. 2019, retrieved from <https://devpost.com/software/cherry-swap> [retrieved Dec. 18, 2019], 11 pages.

CDX, "Tokenizing the $10 trillion credit default swap asset class", dated Mar. 26, 2019, 11 pages.

Chorlian et al., "RateLock", ETHBerlinZwei, Aug. 2019, retrieved from <https://devpost.com/software/rateswap> [retrieved Dec. 18, 2019], 12 pages.

Juliano, "dYdX: A Standard for Decentralized Margin Trading and Derivatives", dated Sep. 25, 2017, updated Aug. 6, 2018, pp. 1-20.

Lildex, "Hedging DeFi interest rate risk on-chain", dated Aug. 8, 2019, retrieved from <http://lildex.com/hedging-defi-interest-rate-risk-on-chain/> [retrieved Dec. 18, 2019], 7 pages.

Powell, "Betting on DeFi Interest Rates", dated Dec. 2, 2019, retrieved from <https://medium.com/maple-finance/betting-on-defi-interest-rates-b6ef4f589dd6> [retrieved Dec. 18, 2019], 4 pages.

Young et al., "CDx: Credit Default Swaps on the Ethereum Public Blockchain", dated Sep. 4, 2018, 33 pages.

Zhen, "LSDai (Long-Short Dai Interest)", ETHBerlinZwei, Aug. 2019, retrieved from <https://devpost.com/software/lsdai#updates> [retrieved Dec. 18, 2019], 9 pages.

PCT International Search Report and Written Opinion, PCT Application No. PCT/US2020/025776, dated Jun. 23, 2020, 11 pages.

github.com, "interest-rate-swaps/src/swaps.sol," Solidity source code file dated Mar. 11, 2019, pp. 1-4, [Online] [Retrieved on Feb. 24, 2022] Retrieved from the Internet <URL:https://github.com/vamsiraju/interest-rate-swaps/blob/master/src/swaps.sol>.

github.com, "interest-rate-swaps/src/swaps.t.sol," Solidity source code file dated Mar. 11, 2019, pp. 1-4, [Online] [Retrieved on Feb. 24, 2022] Retrieved from the Internet <URL:https://github.com/vamsiraju/interest-rate-swaps/blob/master/src/swaps.t.sol>.

IP Australia, Examination Report, AU Patent Application No. 2020271014, dated Sep. 15, 2021, four pages.

* cited by examiner

SYSTEMS AND METHODS FOR TOKENIZED CONTROL OF SMART CONTRACTS

CROSS-REFERENCE TO RELATED APPLICATIONS

This application claims the benefit of U.S. Provisional Patent Application No. 62/832,145, filed Apr. 10, 2019, U.S. Provisional Patent Application No. 62/835,801, filed Apr. 18, 2019, U.S. Provisional Patent Application No. 62/879,187, filed Jul. 26, 2019, and U.S. Provisional Patent Application No. 62/897,589, filed Sep. 9, 2019, the entire contents of which are incorporated herein by reference.

FIELD

The described embodiments relate to systems and methods for conducting electronic transactions and, in particular, electronic transactions in a distributed ledger system.
Introduction The Ethereum blockchain is programmable, and allows users to create and deploy custom programs in the form of smart contracts. The programmability of the Ethereum blockchain is made possible in part by the Ethereum Virtual Machine ("EVM"), which is Turing complete, and operates to execute the program code of smart contracts deployed on the Ethereum blockchain.

The Ethereum blockchain is comprised of multiple nodes that communicate with each other via a peer-to-peer network protocol. Each node executes its own EVM and, in particular, each node executes the same program code of deployed smart contracts using its own local EVM. Because each node executes the EVM separately, the Ethereum network uses a protocol to maintain consensus across all nodes, allowing nodes to maintain a shared state. This consensus mechanism renders certain data stored in the blockchain immutable after it has been confirmed via the consensus mechanism.

SUMMARY

In a first broad aspect, there is provided a method for automatically conducting a continuous forward rate agreement (CFRA) in a cryptocurrency using smart contracts, the method comprising: identifying a first smart contract, the first smart contract having a first address and a first borrower address associated therewith, the first smart contract having (i) a owed amount value initially based on an amount of cryptocurrency transferred to the first borrower address, (ii) a collateral value representing a value of a collateral object committed to the smart contract associated with the first borrower address, (iii) an interest rate query routine configured to periodically determine a first variable interest rate based at least on an extrinsic rate or an intrinsic rate; identifying at least one loan token associated with the first smart contract, the at least one loan token representing an interest in the collateral object; identifying a second smart contract, the second smart contract having a second address and a first lender address associated therewith, the second smart contract having (i) a lender balance representing a lender amount of cryptocurrency associated with the first lender address, and (ii) a second interest rate query routine configured to periodically determine a second variable interest rate based at least on the extrinsic rate or the intrinsic rate; generating an obligation object, wherein generating the obligation object comprises: receiving control of the at least one loan token; generating a borrower balance of the obligation object based on the collateral value associated with the at least one loan token; receiving control of the lender amount; generating the lender balance of the obligation object based on the lender amount; generating at least one lender token and at least one borrower token; associating the at least one lender token with the first lender address; associating the at least one borrower token with the first borrower address; and determining a predetermined interest rate associated with the obligation object; and executing the obligation object, wherein executing the obligation object comprises: receiving at least one first payment from the first borrower address; receiving at least one second payment from the first lender address; updating the borrower balance based on the at least one first payment and the at least one second payment; detecting a triggering event; and in response to detection of the triggering event: computing a lender return amount based on the lender balance and the at least one first payment; computing a borrower return amount based on the borrower balance and the at least one first payment; and releasing a cryptocurrency based on the lender return amount and the borrower return amount.

In some cases, the at least one lender token comprises a plurality of lender tokens.

In some cases, a subset of the plurality of lender tokens is associated with a second lender address, and wherein the lender amount is re-allocated between the first lender address and the second lender address according to a proportion of the plurality of lender tokens associated with the first and second lender addresses, respectively.

In some cases, the method may further comprise: de-associating the at least one lender token from the first lender address; transferring a subset of the loan amount to the first lender; and receiving a secondary loan amount to replace the subset of the loan amount, from the second lender.

In some cases, the at least one borrower token comprises a plurality of borrower tokens.

In some cases, a subset of the plurality of borrower tokens is associated with a second borrower address, and wherein the borrower balance is re-allocated between the first borrower address and the second borrower address according to a proportion of the plurality of borrower tokens associated with the first and second borrower addresses, respectively.

In some cases, the method may further comprise de-associating the at least one borrower token from the first borrower address.

In some cases, generating the obligation object further comprises querying an external server or smart contract to determine the predetermined interest rate.

In some cases, the predetermined interest rate is fixed.

In some cases, executing the obligation object further comprises: determining that the extrinsic rate is below the predetermined interest rate; and increasing a proportion of the loan amount to be allocated to the lender address, based on the difference between the extrinsic rate and the predetermined interest rate.

In some cases, executing the obligation object further comprises: determining that the extrinsic rate is above the predetermined interest rate; and increasing a proportion of the loan amount to be allocated to the borrower address, based on the difference between the extrinsic rate and the predetermined interest rate.

In some cases, receiving control of the lender amount comprises the obligation object receiving control of the lender amount, the method further comprising transferring a portion of the lender amount to the first smart contract to reduce the owed amount value.

In some cases, detecting the triggering event comprises detecting that the collateral value is lower than the loan amount presently allocated to the lender.

In some cases, detecting the triggering event comprises detecting that a term of the obligation object has elapsed.

In some cases, the first payment is at least one borrower interest payment based on the first variable interest rate.

In some cases, the second payment is at least one lender interest payment based on the second variable interest rate.

In some cases, the obligation object is a smart contract.

In some cases, the at least one first payment comprises a plurality of payments, and wherein the monitoring the at least one first payment comprises periodically monitoring the plurality of payments.

In some cases, the cryptocurrency is based on a form of Dai. In some cases, the extrinsic rate is a Dai Savings Rate. In some cases, the extrinsic rate is based on a dividend rate.

In another broad aspect, there is provided a method for automatically conducting a continuous forward rate agreement in a cryptocurrency using smart contracts, the method comprising: generating an obligation object, the obligation object having a first address and a first borrower address associated therewith, the obligation object having (i) an owed amount value initially based on an amount of cryptocurrency transferred to the first borrower address, (ii) a collateral value representing a value of a collateral object committed to the obligation object by the first borrower address, (iii) an interest rate query routine configured to periodically determine a first variable interest rate based at least on an extrinsic rate or an intrinsic rate, the obligation object further having a first lender address associated therewith, and (i) a lender balance representing a lender amount of cryptocurrency associated with the first lender address, wherein generating the obligation object further comprises: generating a borrower balance of the obligation object based on the collateral value associated with the at least one loan token; generating the lender balance of the obligation object based on the lender amount; generating at least one lender token and at least one borrower token; associating the at least one lender token with the first lender address; associating the at least one borrower token with the first borrower address; and determining a predetermined interest rate associated with the obligation object; and executing the obligation object, wherein executing the obligation object comprises: receiving at least one first payment from the first borrower address; receiving at least one second payment from the first lender address; updating the borrower balance based on the at least one first payment and the at least one second payment; detecting a triggering event; and in response to detection of the triggering event: computing a lender return amount based on the lender balance and the at least one first payment; computing a borrower return amount based on the borrower balance and the at least one first payment; and releasing a cryptocurrency based on the lender return amount and the borrower return amount.

In another broad aspect, there is provided a non-transitory computer readable medium storing computer program code executable by a processor, which when executed by the processor causes the processor to carry out the methods described herein.

In still another broad aspect, there is provided a system for automatically conducting a continuous forward rate agreement in a cryptocurrency using smart contracts, the system comprising: a data communications network; at least one lender device; at least one borrower device; and at least one node device comprising a processor and a memory, the processor configured to carry out the methods described herein.

DRAWINGS

A preferred embodiment of the present invention will now be described in detail with reference to the drawings, in which.

DEFINITIONS

Figure 1:
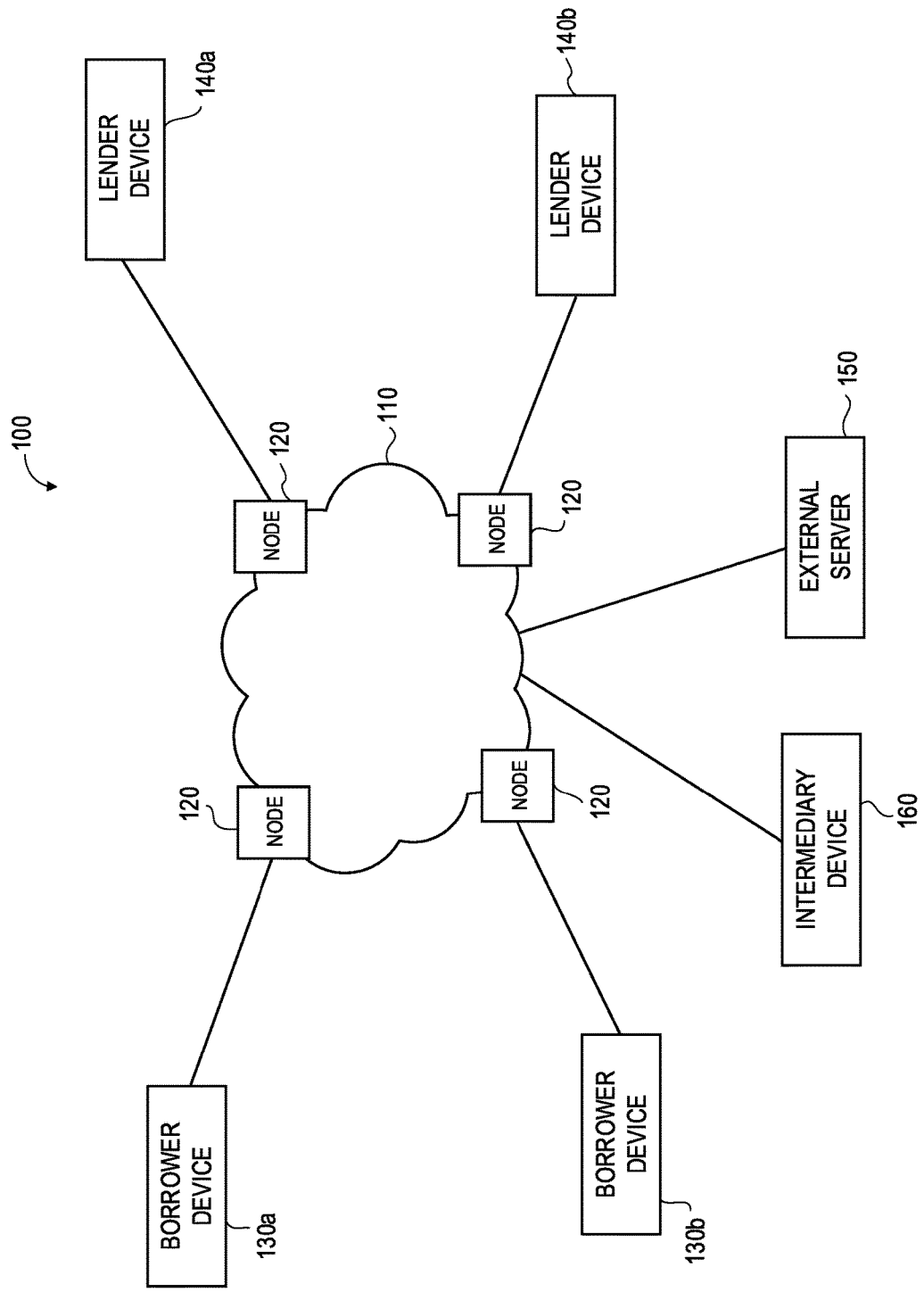
FIG. 1 is a schematic block diagram of a system in accordance with at least some example embodiments.

Collateralized Debt Position (CDP)—an agreement, generally enforced via smart contract, which permits an assetholder to deposit a digital asset, and borrow a corresponding amount of Dai. The borrowed Dai must be repaid to withdraw the collateral asset. A CDP is collateralized in excess, meaning that the value of the collateral is intended to be higher than the value of the generated Dai.

Continuous Forward Rate Agreement (CFRA)—a variant of a forward rate agreement that incorporates the continuous aspects of an interest rate swap. In a CFRA, the amount owed may be a function of an externally-defined rate or rates over the life of the contract (rather than merely the end). This is in contrast to a conventional forward rate agreement, in which the amount owed is computed solely based on the rate at the expiry of the agreement term.

Decentralized Autonomous Organization (DAO)—an organization represented by rules defined in a computer program, such as a smart contract, and which is controlled by shareholders. The DAO's records and program rules may be stored and updated on a blockchain.

Dai—a decentralized, collateral-backed cryptocurrency, which is programmed to maintain a stable value relative to an extrinsic store of value (i.e., U.S. Dollar). Dai is administered by the Maker DAO. Dai is stabilized through a system of Collateralized Debt Positions, autonomous feedback mechanisms and incentives for external actors.

Dai Savings—a mechanism, such as a smart contract, implemented in the Dai cryptocurrency that enables a holder of Dai cryptocurrency to lock or unlock Dai at any time. Dai that is locked accrues additional Dai over time, at a rate based on the DSR value.

Dai Savings Rate (DSR)—a global system variable in the Dai cryptocurrency system, which defines the interest or accrual rate for locked Dai.

Governance Fee—a fee paid by holders of a CDP smart contract to the holders of the MKR governance token, as compensation for the costs of minting Dai and to incentivize MKR holders to keep the value of Dai stable.

MKR—a governance token within the Maker DAO system. Holders of MKR tokens are permitted to cast votes on proposals for changes to the Maker DAO.

Stability Fee—a fee charged to borrow Dai using a CDP, the Stability Fee is based on the Governance Fee and DSR.

DESCRIPTION OF VARIOUS EMBODIMENTS

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details, or with other methods, components, materials, etc. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

Unless the context requires otherwise, throughout the specification and claims which follow, the word "comprise" and variations thereof, such as, "comprises" and "comprising" are to be construed in an open, inclusive sense, that is as "including, but not limited to."

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

Similarly, throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

It should also be noted that there may be some elements that are used to implement at least part of one of the embodiments described herein that may be implemented via software or software applications that are written in a high-level computer programming language such as one that employs a functional paradigm or object-oriented paradigm. Accordingly, the program code may be written in Python, Java, C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

A software application can be, for example, a monolithic software application, built in-house by an organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs.

Software applications may be deployed to and installed on a computing device on which they are to operate. Depending on the nature of the operating system and/or platform of the computing device, an application may be deployed directly to the computing device, and/or the application may be downloaded from an application marketplace. For example, user of the user device may download the application through an app store such as the Apple App Store™ or Google™ Play™.

At least some of these software programs may be stored on a storage media (e.g. a computer readable medium such as, but not limited to, ROM, EEPROM, magnetic disk, optical disc) or a device that is readable by a general or special purpose programmable device. The software program code, when read by the programmable device, configures the programmable device to operate in a new, specific and predefined manner in order to perform at least one of the methods described herein.

The terms "program", "software program", "software application", "application" and "smart contract" as used herein refer to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled. Software applications may include mobile applications or "apps" for use on mobile devices such as smartphones and tablets or other "smart" devices.

A smart contract is a particular type of software program. Generally, a smart contract is programmed to apply or enforce a set of rules or conditions. These rules or conditions may depend on extrinsic factors, such as data from external sources (e.g., a web server, a third-party device, etc.). For example, in at least some smart contracts, the program code may be triggered by an input message, causing the smart contract to execute at least one subroutine. The at least one subroutine may, for example, query a server, obtain response data, and then carry out some further action (e.g., "enforce" certain terms of the smart contract) according to the smart contract's program code.

In at least some embodiments, a smart contract may be implemented using a blockchain or distributed ledger system, such as the Ethereum blockchain developed by the Ethereum Foundation. However, in some alternative embodiments, a smart contract may be implemented without a blockchain or distributed ledger system.

Operation of the Ethereum blockchain can be modeled as a series of state transitions for a plurality of "accounts". Accordingly, the Ethereum blockchain, via execution of EVMs at each node, tracks the state of every account. State transitions on the Ethereum blockchain can be considered as transfers of information by and/or between accounts. There are two primary types of accounts: Externally Owned Accounts (EOAs), which are controlled by private cryptographic keys; and Contract Accounts, which are controlled by smart contract code, and may be "activated" or "triggered" by an EOA or, more particularly, when a transaction occurs that causes the Contract Account to activate and perform an operation. Both types of accounts have an address associated therewith, which may be represented as a hexadecimal string (e.g., 0xbfb2e296d9cf3e593a79981235aed29aa9984c0f).

The term "smart contract" can refer to code in a Contract Account—programs that execute when a transaction is sent to that account. Users can create new contracts by deploying code to the blockchain. Each smart contract generally has at least one Contract Account, and therefore at least one unique address. Generally, the computer program code of smart contracts executes in discrete intervals, in response to external triggers or activations (e.g., queries, updates or other transactions on the underlying blockchain), rather than executing continuously over time.

While the embodiments are described herein with reference to the Ethereum blockchain, the described embodiments may also be implemented using other blockchain or distributed ledger systems. In some cases, the described embodiments may also be implemented using a centralized approach.

The description sets forth various embodiments of the systems, devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory computer-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

Popular digital assets such as Bitcoin (BTC) and Ether (ETH) are too volatile to be used as everyday currency. The value of BTC often experiences large fluctuations, rising or falling by as much as 25% in a single day and occasionally rising over 300% in one month.

The Dai Stablecoin ("Dai") is a collateral-backed cryptocurrency whose value is designed to be stable relative to a given fiat currency, such as the United States Dollar. The Dai Stablecoin is administered and managed by a decentralized autonomous organization (DAO) called Maker DAO, or simply "Maker".

Maker provides a smart contract platform on the Ethereum blockchain that backs and stabilizes the value of Dai related to a fiat currency through a dynamic system of Collateralized Debt Positions (CDPs), autonomous feedback mechanisms, and incentives to external actors.

Maker enables anyone to leverage their Ethereum assets to generate Dai on the Maker Platform. Once generated, Dai can be used in the same manner as any other cryptocurrency: it can be freely sent to others, used as payments for goods and services, or held as long-term savings. The generation of Dai also creates the components needed for a robust decentralized lending platform. Users also can obtain Dai by buying it from brokers or exchanges Holders of Dai can utilize the Dai Savings mechanism to earn a steady, low-risk return on their holdings based on the Dai Savings Rate.

Anyone who has collateral assets can leverage them to generate Dai using Maker's Collateralized Debt Positions. Generally, a collateral asset is a digital asset that the decentralized Maker governance process has recognized and input into the system. For example, Ether cryptocurrency (ETH) is one form of digital asset that may be recognized as a collateral asset.

CDPs are smart contracts that hold collateral assets deposited by a user and permit the user to generate Dai in exchange for control of the collateral asset. However, generating the Dai also accrues a debt. This debt effectively locks the deposited collateral assets inside the CDP smart contract until it is later covered by transferring an equivalent amount of Dai to the CDP smart contract, along with accrued interest, at which point the collateral asset can be withdrawn. As a policy, active CDPs are collateralized in excess, meaning that the value of the collateral is higher than the value of the debt.

In the Maker platform, if the value of collateral in a CDP drops below the total debt (e.g., borrowed amount+accrued interest), the CDP can be liquidated and terminated.

In the Maker platform, holders of Dai can be considered as indirect lenders to CDP users, since Dai holders essentially—through their locked Dai—serve to provide liquidity to the debt generated by CDP users. In view of this, Dai holders may be referred to as "lenders" and CDP users may be referred to as "borrowers", even though there need not be any direct lending or borrowing between any parties. That is, any "lending" and "borrowing" may be indirect via the distinct mechanisms of Dai Savings and CDP smart contracts.

Figure 6:
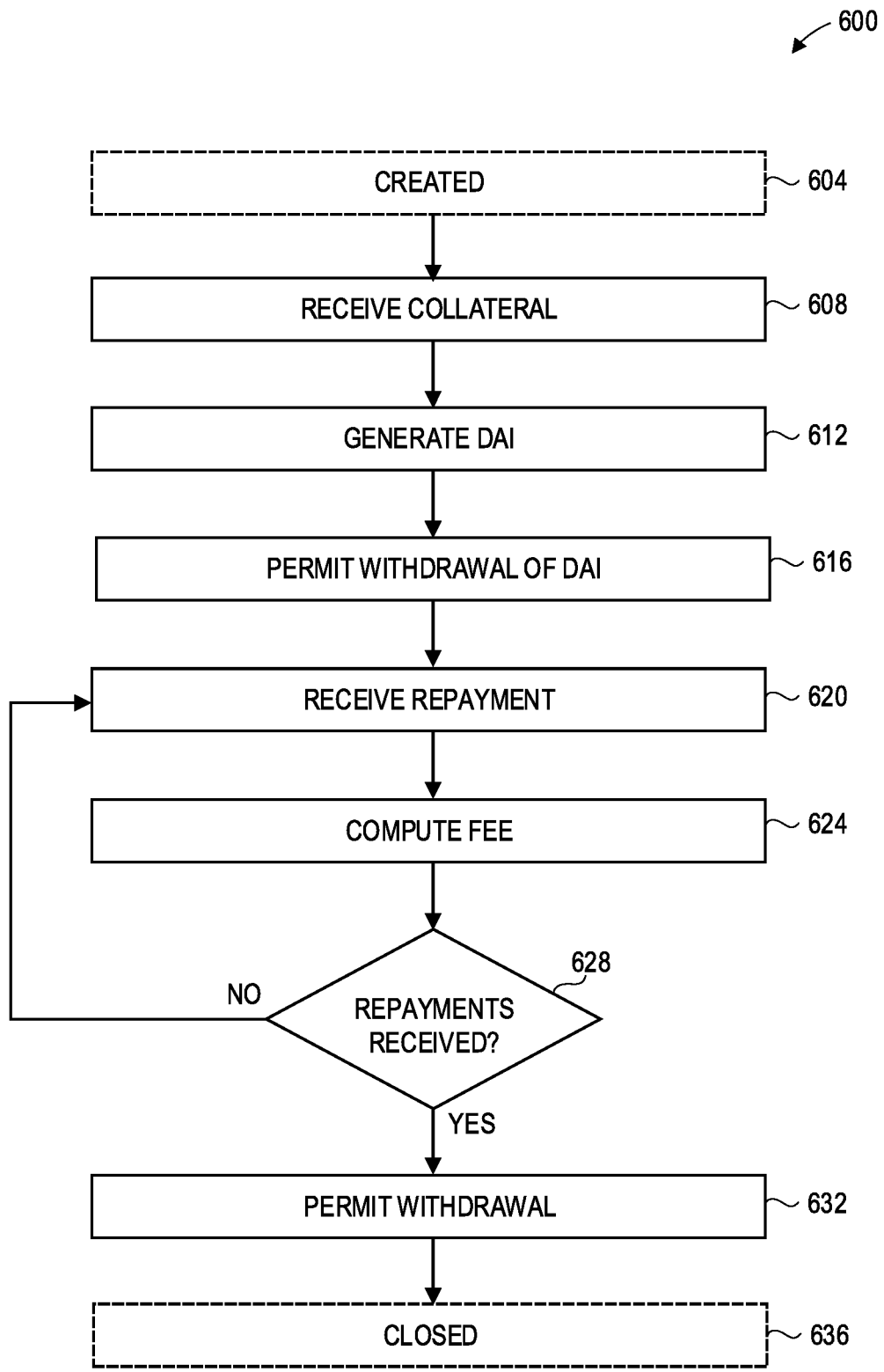
FIG. 6 is a process flow diagram for an example life cycle of a CDP smart contract.

Referring now to FIG. 6, there is illustrated a process flow diagram for an example life cycle of a CDP smart contract. As described herein, the process flow diagram may be carried out by a node of a blockchain, such as the Ethereum blockchain, when executed in an EVM.

At 604, the CDP may be instantiated by a transaction to Maker, and at 608, a collateral deposit may be received by the CDP smart contract, e.g., in the form of ETH cryptocurrency. At this point, the CDP may be considered collateralized.

At 612, the CDP generates an amount of Dai cryptocurrency based on the determined value of the collateral deposit at 608.

At 616, the CDP receives a withdrawal transaction from the user. The withdrawal transaction indicates an amount of Dai desired to be withdrawn from the CDP. The CDP smart contract then determines whether the Dai is available to be withdrawn and, if it is, authorizes the withdrawal. The CDP smart contract also updates an internal debt balance, which can be used to cause the smart contract to prevent withdrawal of the entire collateral asset until the internal debt balance is reduced to zero. However, in some embodiments, partial withdrawal of the collateral asset may be permitted by the smart contract according to a proportion of the total debt that has been paid.

At 620, the CDP receives a repayment transaction from the user. The repayment transaction transfers an amount of Dai to the CDP smart contract. At 624, the CDP smart contract computes a fee, also called a Stability Fee, based on the amount of time the debt has been outstanding and adds this to the internal debt balance. The fee may also be computed at other times.

At 628, the CDP determines whether it has received repayment of any portion of the internal debt balance, including any fee or fees that have accrued. If payments have been received, then the CDP may permit withdrawal of a corresponding portion of the collateral asset at 632. For example, if repayments of 40% of the debt balance (and associated fees) have been received, then up to 40% of the collateral asset may be permitted to be withdrawn, if it is sub divisible. At 636, the CDP may be closed if it contains no collateral assets (e.g., if all repayments have been made and collateral assets withdrawn).

Although the acts of method 600 are shown as discrete acts, in some embodiments, at least some acts may be combined, or further subdivided. For example, in some embodiments, the act of generating Dai cryptocurrency (612) may be combined with the act of withdrawal (616) in a single combined act.

When, due to changing market dynamics, the market price of Dai deviates from the Target Price in the short run, Maker can mitigate this price instability by modifying the Dai Savings Rate. The Dai Savings Rate is a global system parameter that both affects how much Dai holders can earn in return on their holdings over time, as well as the base borrowing cost for generating Dai from CDPs.

For example, if the market price of Dai falls below a target price (e.g., $1 USD), the Dai Savings Rate may increase. This boosts demand and stifles supply by incentivizing more Dai holders, and fewer CDP users, which is expected to increase the market price up towards the $1 USD target price.

On the contrary, if the market price of Dai is above $1 USD, the Dai Savings Rate may decrease. This stifles demand and boosts supply, which is expected to reduce the market price of Dai down towards the $1 USD target price.

Together these two mechanisms serve to adjust the value of Dai towards the target price.

The Maker platform also provides for a savings system, which pays interest. A person who holds Dai cryptocurrency may lock Dai using the Dai Savings mechanism at any time, and may unlock Dai at any time also. When locked using the Dai Savings mechanism, Dai accrues over time, based on a global system variable called the Dai Savings Rate (DSR). There are no restrictions or fees for using the Dai Savings mechanism other than the Ethereum "gas" required for locking and unlocking transactions.

For example, if the DSR remains at an average of 2%, a user who locks 100 Dai into DSR mode, and keeps it locked for the full year, would earn 2 Dai, which will be added automatically to their account. The accrued amount may be added, for example, when the Dai is unlocked or, in some cases, may be added at periodic intervals (e.g., in response to a query, update or other transaction).

The DSR is funded out of the Stability Fees paid in CDP smart contracts. For example, if the average Stability Fees collected on CDPs are 3%, such fees may be used to fund a DSR of 2%.

The DSR helps balance the supply and demand of Dai, and is one of the monetary policy levers that decentralized Maker governance can control. As noted, DSR is a global parameter that may be adjusted often to deal with short-term changes in market conditions of the Dai economy. This is in contrast to risk governance, which is a long-term process that involves setting Stability Fees, and other risk parameters individually for each collateral type.

It should be noted again that, while the various embodiments are described herein with reference to the Ethereum blockchain, Maker platform and Dai cryptocurrency, the described methods and systems may be applied in other contexts, for example on different blockchain systems, with different cryptocurrencies, or, in some cases, in centralized non-blockchain systems.

Both Stability Fees and the Dai Savings Rate are variable, and fluctuate over time. However, users may desire to have predetermined rates both when borrowing and when depositing their Dai.

The described embodiments may relate to systems and methods for providing predetermined interest rates for borrowers and depositors of an asset (e.g., Dai or other cryptocurrency) through a continuous forward rate agreement.

In an aspect of the described approach, a user, a borrower, may borrow Dai using a first smart contract (CDP smart contract), in exchange for collateral (e.g., ETH cryptocurrency) that is valued more than the borrowed Dai. The borrower pays a Stability Fee (i.e., interest) at a variable rate to borrow the Dai. The Stability Fee is based on a Governance Fee and the Dai Savings Rate (DSR), both of which may fluctuate over time.

Another user, a depositor, may hold Dai. The depositor may lock the held Dai and thereafter receive interest at a variable rate based on the DSR.

In an aspect, the described systems and methods provide for a continuous forward rate agreement smart contract (or other digital contract). The continuous forward rate agreement contract generally sets a predetermined or fixed interest rate (or a rate tied to some external metric other than DSR such as Federal Funds Rate or London Inter-bank Offer Rate (LIBOR)) between the borrower and depositor. If the current DSR drops below the predetermined interest rate, the borrower may be required to pay the depositor the difference from its lower borrowing costs, such that both parties' interest rate remains at the predetermined rate or rates. However, since the DSR and Stability Fee are correlated, the Stability Fee paid by the depositor may also decrease. Similarly, if the current DSR rises above the predetermined interest rate, the depositor may be required to pay the borrower the difference from the increased interest profits (and the Stability Fee increases). Accordingly, both parties can obtain a predetermined interest rate, due to the correlation between the DSR and the Stability Fee.

In at least some embodiments, the continuous forward rate agreement may be initiated by the borrower, through an intermediary user, which may price the CFRA based on a risk analysis of the collateral assets and other aspects of the proposed CFRA. The intermediary may purchase the CFRA from the borrower and then sell the CFRA to a depositor.

In some embodiments, the system can include multiple forms of escrow. In particular, a first centralized custody may hold tokens representing the borrower's and the depositor's positions in the CFRA contract. A second custody (either centralized or decentralized) may hold control of the CDP from the borrower and control of the Dai from the depositor as collateral for the CFRA contract.

In some embodiments, the borrower and depositor may sell their CFRA positions (i.e., the tokens representing their respective position) to a subsequent borrower(s) or a subsequent depositor(s), respectively. The initial party can then receive back some of their collateral from the second custody, which is replenished by the subsequent party (e.g., if additional collateral is required). The tokens at the first custody are then updated to reflect the new positions of the parties.

Generally, the smart contract has a fixed term at which the contract may end. In some circumstances, a mechanism may be provided for extending the term of the CFRA contract based on one or more factors, such as agreement of the parties. However, the smart contract may also end in some other circumstances (e.g., if the value of the CDP drops below the value the borrower owes the depositor). When the smart contract ends, each party's position is settled by paying out each party their amount owed. This may involve multiple parties if the borrower or depositor has sold their CFRA position to a subsequent borrower or a subsequent depositor.

Depositors generally may desire assurances that the collateral to a CFRA contract is within their risk tolerances. Accordingly, intermediary users may be called upon to assess collateral and price CFRA contracts. Intermediary users may also, in some cases, determine if the collateral is likely to drop below the liquidation price (minimum collateralization ratio) of a CFRA contract during its term, and whether the collateral can be liquidated. In general, the intermediary may be incentivized to improve the user experience of the lender. This principle—that the interest accrues with time—then also improves the user experience of the borrower, since the borrower will not wish to pay interest if their collateral has been liquidated.

Intermediary users may be compensated each time the CFRA contract is executed, or at prescribed milestones (e.g., termination of the CFRA contract).

The described systems and methods provide for CFRA contracts to be collateralized by control or ownership of CDP contracts, as control of CDP contracts can be tokenized, and the tokens representing the control or ownership interest can be used as collateral for CFRA contracts. In some embodiments, the CDP contract itself may be tokenized. In other embodiments, a separate smart contract may be used to "wrap" the CDP contract and generate tokens representing control of, or interest in, the CDP contract. In such a way, a third-party can control the collateral object (e.g., CDP contract), by receiving the tokens that represent control of, or interest in, the CDP contract.

Some of the described systems and methods involve the use of tokens that are managed by smart contracts and therefore such tokens can be, among other things, created, transferred, subdivided, multiplied, destroyed and so forth. These functions can be performed autonomously by the nodes of a blockchain system according to the execution of smart contracts (each of which has respective Contract Accounts), and therefore without the intervention of a human administrator. Moreover, the origin and use of the such tokens can be cryptographically secured—both by Externally Owned Accounts and Contract Accounts—and recorded, which enhances security, reliability and trustworthiness both in the tokens themselves, and also in the transactions that involve such tokens. In this sense, the described tokens are just one example of the manner in which at least some embodiments apply or use certain inherent aspects of blockchain or distributed ledger technology to enhance the security, reliability and trustworthiness of the described transactions.

In another example, the use of smart contracts, which are controlled by Contract Accounts, enhances the security, reliability and trustworthiness of the described transactions in a way that would not be achievable if the functions of the smart contracts were executed by humans. In particular, because Contract Accounts can be designed to operate securely and autonomously, their use can enhance trust in the risk management functions they perform in a manner that would not be possible if human operators were performing the same functions. Unlike human agents, Contract Accounts inherently are not susceptible to moral hazards, and therefore can be used as escrow agents. Therefore, when a Contract Account—by way of its associated smart contract—receives control of an asset by virtue of a cryptographically-signed transaction, all parties can have increased confidence that the agreed-upon rules of the smart contract will be followed and that fraud by the smart contract itself is unlikely, if not altogether impossible. This then mitigates counterparty risk.

In another aspect, the distributed nature of the described embodiments can enhance trustworthiness of the system, since the activity of many users dealing in small amounts serves to strengthen the overall system. By design, individual liquidations will not adversely affect other users.

In some embodiments, assets other than stablecoins (e.g., DAI) may be used as collateral by an intermediary user, and placed into a collateral object. For example, an asset that is correlated to the extrinsic or intrinsic interest rate may be used as collateral.

In some embodiments, the borrower user may undertake some counterparty risk and allow the intermediary user to use the same collateral object for multiple CFRA contracts. However, the presence of some collateral may allow the parties to enter the contract with a low level of risk.

There can be a variety of different intermediary users, who aim to improve experience of either borrower, lender, or both. As noted, the described embodiments allow for positions (whether borrower, depositor, or intermediary) in a CFRA contract to be transferred by transfer of the tokens representing that position.

Referring now to FIG. 1, there is provided a schematic block diagram of an example system in accordance with at least some embodiments. System 100 has a network 110, one or more node devices 120 that communicate via network 110, a borrower device 130a, and a lender device 140a. Optionally, system 100 may have one or more additional borrower device 130b and one or more lender device 140b. In at least some embodiments, system 100 has at least one intermediary device 160. In at least some embodiments, system 100 has at least one external server 150.

Network 110 is a data communications network, such as the Internet, which enables data communication among elements of network 110 via one or more protocols and interfaces such as Ethernet. In some cases, various data communications among one or more elements of network 110 may be encrypted or tunneled via virtual private networks. In some cases, network 110 may be a private network, or a combination of public and private networks.

Nodes 120 are computing devices in data communication with network 110. In at least some embodiments, each node 120 is configured to act as a blockchain node, by executing a blockchain node software application. For example, the node 120 may be an Ethereum blockchain node, and may be configured to execute the Ethereum Virtual Machine, and to participate in the Ethereum blockchain peer-to-peer network. However, in some alternative embodiments, one or more node 120 may be a conventional server computer, which serves as a gateway to a centralized system.

Each borrower device 130a and 130b, and lender device 140a and 140b is a computing device, such as a personal computer, server computer, tablet computer, smartphone or other computing device. In embodiments that employ a blockchain system, borrower devices and lender devices may connect to a node 120 of the blockchain system to initiate transactions and other actions, and to receive notifications of the results of those transactions (e.g., the current state) as described further herein.

Although borrower and lender devices are shown as connecting to a node 120 for illustrative purposes, each of the borrower and lender devices may connect to other elements of network 110, and have their data communications routed to and from a node 120.

External server 150 is a server computer that may or may not participate in the blockchain system. However, external server 150 may be queried by other devices for a response to some inquiry. For example, in some embodiments, external server 150 may serve as an agreed-upon "oracle" for certain data, such as prevailing interest rates.

Intermediary device 160 is at least one computing device, such as a personal computer, server computer, tablet computer, smartphone or other computing device, which may be operated by an intermediary entity, a custodial entity, or both, as described further herein.

Each of devices 130a, 130b, 140a, 140b, 150 and 160 may couple to the network 110 through a wired or wireless connection. Although only a small number of computing devices are shown so as not to obscure the description, in some embodiments there may be a large plurality of computing devices and, in particular, borrower and lender devices.

Figure 2:
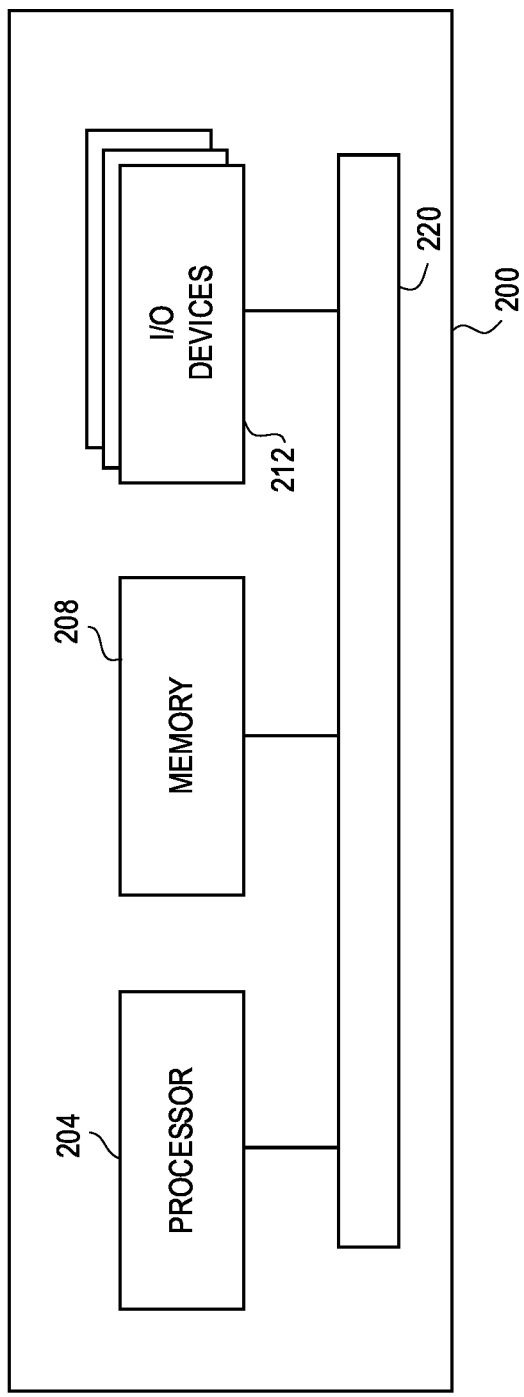
FIG. 2 is a simplified schematic block diagram of a computing device in accordance with at least some example embodiments.

Referring now to FIG. 2, there is provided a simplified schematic block diagram of a computing device in accordance with at least some embodiments. Computing device 200 is an example computing device, and illustrates the components of various computing devices, such as borrower device 130a, 130b, lender device 140a, 140b, node 120, external server 150 and intermediary device 160.

Computing device 200 has at least a processor 204, a memory 208 and at least one input and/or output device 212, each of which may be connected to a system bus 220. In some cases, processor 204 may be configured to communicate directly with memory 208 or input/output device 212, bypassing system bus 220. Computing device 200 may be a personal computer, server computer, tablet computer, smartphone, other computing device, or any combination of these.

It will be understood that, in some embodiments, each of the processor 204, the input/output device 212, and the memory 208 may be combined into a fewer number of components or may be separated into further components.

The processor 204 may be any suitable processors, controllers or digital signal processors that can provide sufficient processing power depending on the configuration, purposes and requirements of the system 100. In some embodiments, the processor 204 can include more than one processor with each processor being configured to perform different dedicated tasks.

The input/output device 212 may be any interface device that enables the computing device 200 to receive inputs or transmit outputs. For example, input/output device 212 can be at least one of a serial port, a parallel port or a Universal Serial Bus (USB) port. The input/output device 212 may also be at least one of an Internet, Local Area Network (LAN), Ethernet, Firewire, modem or digital subscriber line connection. Various combinations of these elements may be incorporated within the input/output device 212.

For example, the input/output device 212 may receive inputs from various input devices, such as a mouse, a keyboard, a touch screen, a thumbwheel, a track-pad, a track-ball, a card-reader, voice recognition software and the like depending on the requirements and implementation of computing device 200. Similarly, the input/output device 212 may transmit outputs, for example in the form of a display, a printer, or other output device.

The memory 208 can include RAM, ROM, one or more hard drives, one or more flash drives or some other suitable data storage elements such as disk drives, etc. The memory 208 can be used to store an operating system and software applications. For instance, the operating system can provide various basic operational processes. The programs can include various user programs so that a user can interact with input/output devices 212 to perform various functions such as, but not limited to, viewing and/or responding to the notifications generated by the computing device 200. User programs can also include, for example, blockchain node software or client software.

Figure 3A:
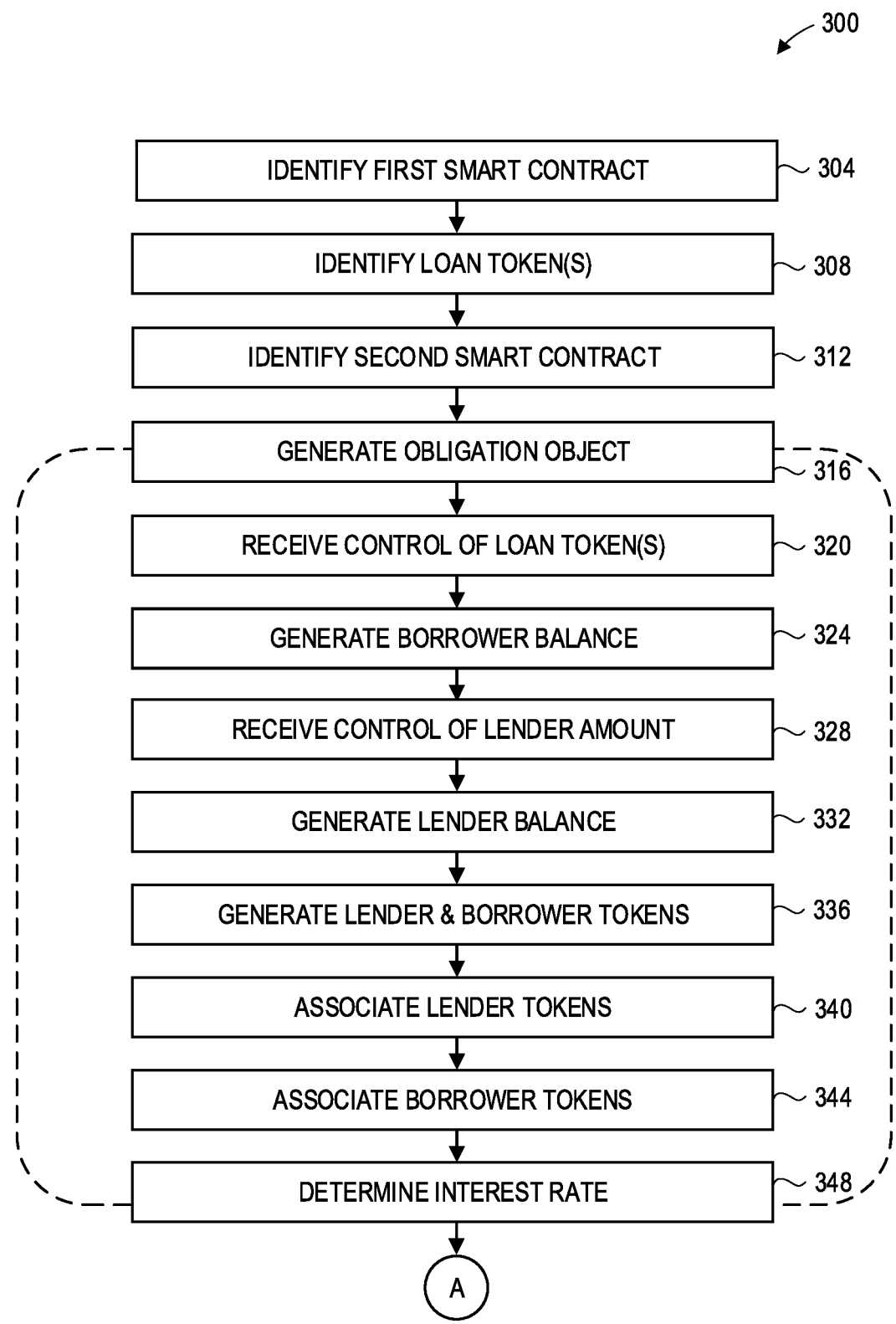
FIGS. 3A to 3C are process flow diagrams illustrating methods of conducting transactions in accordance with at least some embodiments.
Figure 3B:
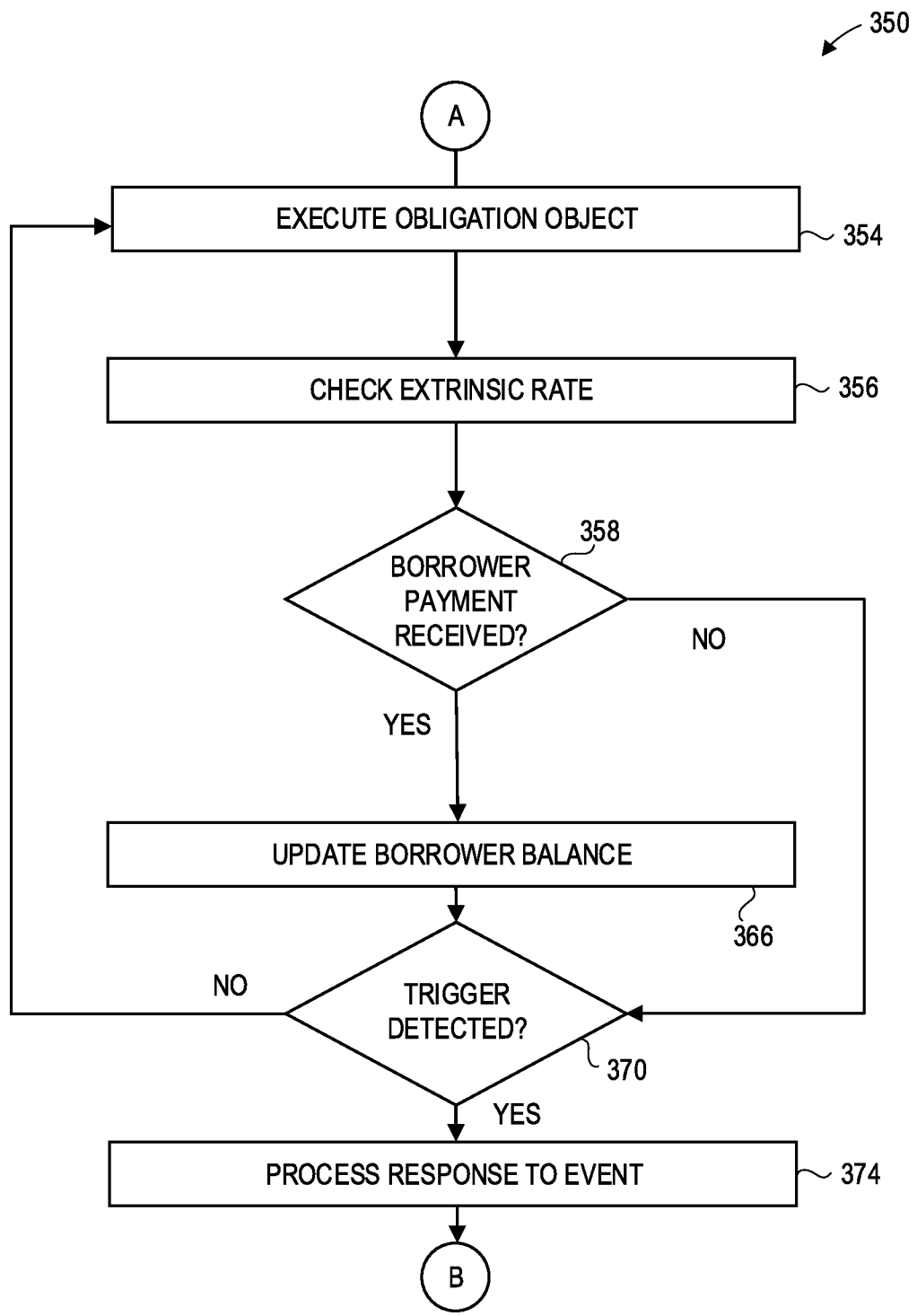
Figure 3C:
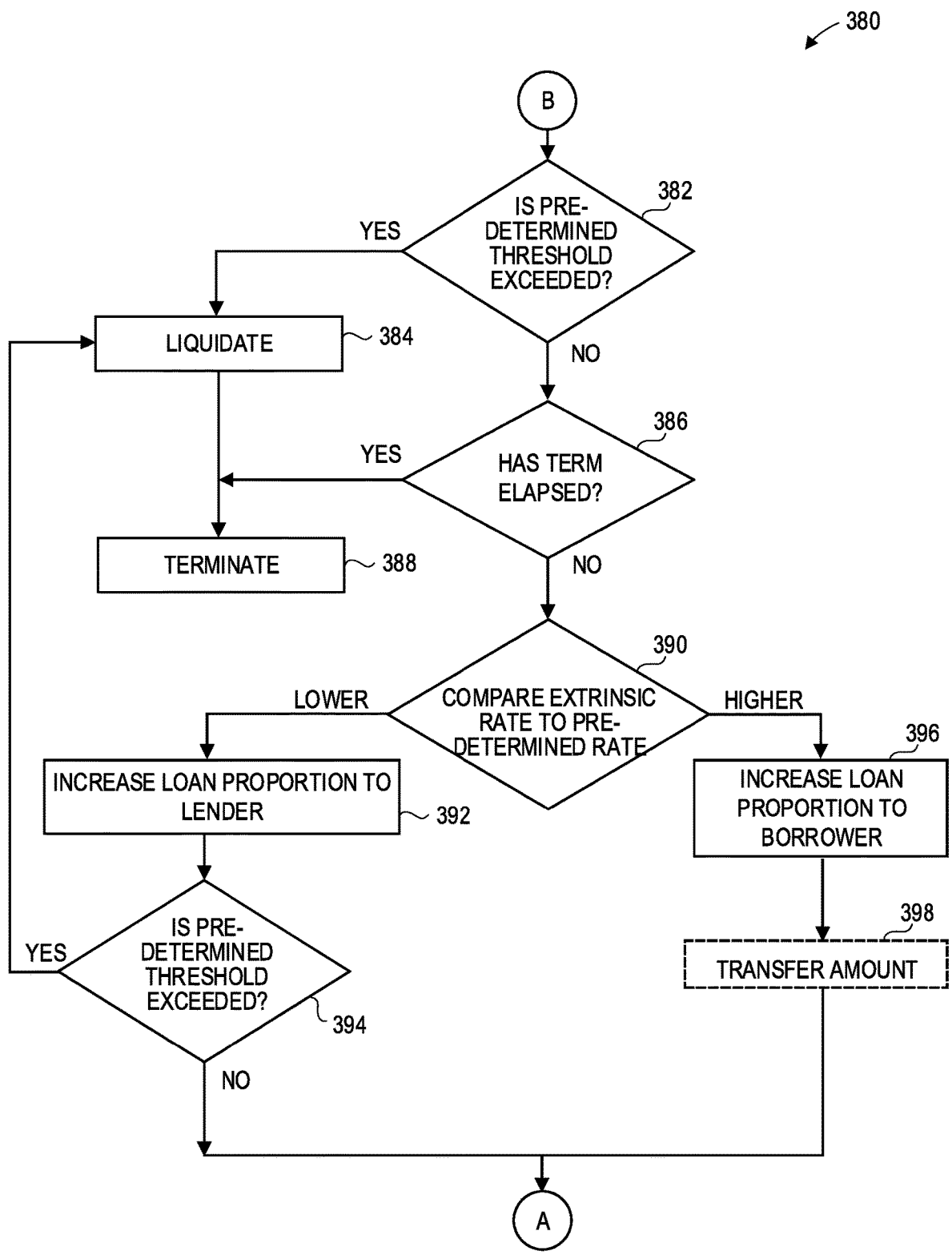

Referring now to FIGS. 3A to 3C, there are illustrated methods of conducting transactions in accordance with at least some embodiments. Method 300 is a method for automatically conducting a continuous forward rate agreement in a cryptocurrency using smart contracts, and may be carried out, for example, by one or more nodes 120 of system 100 of FIG. 1.

Method 300 begins at 304 of FIG. 3A, with identifying a first smart contract. In at least some embodiments, the first smart contract is a CDP smart contract, and also may be referred to as a CDP contract or loan contract. As described, the first smart contract generally has a first address (e.g., the address of its Contract Account) and a first borrower address (e.g., the address belonging to a user who initiated the first smart contract via a borrower device) associated therewith. The first smart contract generally has one or more parameters, such as an owed amount value initially based on an amount of cryptocurrency transferred to the first borrower address (e.g., the initial value of the cryptocurrency received from the CDP), and a collateral value representing a value of a collateral object committed to the smart contract associated with the first borrower address. The first smart contract may also have an interest rate query subroutine configured to periodically determine a first variable interest rate based at least on an extrinsic rate. In at least some embodiments, the cryptocurrency may be Dai and/or other cryptocurrencies such as Ether (ETH). In at least some embodiments, tokens representing a real estate interest, a security interest, or other interest or both. The extrinsic rate may be the Dai Savings Rate, which may be queried from one or more sources, such as an external server of system 100. The first variable interest rate may be determined based on the extrinsic rate.

In some variant embodiments, an intrinsic rate may be used instead of the extrinsic rate. The intrinsic rate may be specified at the time the obligation object is instantiated, or by a subroutine of the obligation object.

At 308, at least one loan token associated with the first smart contract is identified. In some embodiments, the first smart contract is tokenized, and generates its own transferable tokens representing control of the CDP smart contract and an interest in the collateral object. However, in some other embodiments, the first smart contract may not be tokenized natively, in which case a tokenizing smart contract that wraps and "tokenizes" the first smart contract may be used. The tokenizing smart contract may be provided by a third party in some cases to assume control of the CDP smart contract and generate one or more transferable tokens representing control of the CDP smart contract and an interest in the collateral object.

At 312, a second smart contract is identified. The second smart contract may be referred to as a deposit smart contract or deposit contract. The second smart contract generally has a second address (e.g., the address of its Contract Account) and a first lender address (e.g., the address belonging to a user who wishes to earn interest from their cryptocurrency, equipped with a lender device) associated therewith. The second smart contract generally has one or more parameters, such as an owned amount value or lender balance representing a lender amount of cryptocurrency associated with the first lender address, and which the lender owns and wishes to lend or deposit or lock. In at least some embodiments, the second smart contract also may have a second interest rate query routine configured to periodically determine a second variable interest rate based at least on the extrinsic rate. As with the first smart contract, the extrinsic rate may be the Dai Savings Rate, which may be queried from one or more sources, such as an external server of system 100. The second variable interest rate also may be determined based on the extrinsic rate.

In some embodiments, the second smart contract may be a locking mechanism, in which a portion of the user's cryptocurrency (e.g., the owned amount value or lender balance) is simply locked by a cryptocurrency issuing mechanism (which may itself be one or more smart contract). The locked portion may accrue interest during the time it is locked, which may be paid out when the portion is unlocked or in response to another query, update or other transaction.

At 316, an obligation object is generated. In at least some embodiments, the obligation object is a further smart contract that is configured to carry out a continuous forward rate agreement when executed and, as a smart contract, has an obligation object address. Accordingly, the obligation object may be referred to as a CFRA smart contract or swap contract. Generation of the obligation object further comprises acts 320 to 348 as described further herein. However, in some alternate embodiments, the obligation object may be a programmatic contract, albeit not a blockchain-based smart contract.

For ease of description, the obligation object is described as carrying out the acts described herein, however it is reiterated that in at least some of the described embodiments each obligation object is software code (e.g., a smart contract) that can be executed by the processors (e.g., of one or more nodes of a distributed ledger system) to carry out the described acts.

In some alternative embodiments, the first or second smart contracts, or both can be omitted, and the obligation object generated at 316 may be configured to substitute for the first and second smart contracts as needed. In such embodiments, acts 304, 308 and 312 may be omitted, and the obligation object can be configured to perform the functions of the CDP smart contract, the deposit contract, or both.

The obligation object also has parameters, such as a borrower balance, a lender balance, a term and a predetermined interest rate, as described further herein.

At 320, the obligation object receives control of the at least one loan token, for example, by the at least one loan token being transferred to the obligation object address via a transaction.

At 324, the obligation object generates or updates a borrower balance of the obligation object based on the collateral value associated with the at least one loan token. The collateral value may be ascertained, for example, by querying the first smart contract associated with the at least one loan token.

At 328, the obligation object receives control of a lender amount. The lender amount may be cryptocurrency (e.g., Dai), which a lender user wishes to lend, deposit or commit to the obligation object in exchange for an interest amount. In some cases, the lender amount may be tokens representing an interest in another cryptocurrency, which interest may be in the form of a smart contract.

At 332, the obligation object generates or updates the lender balance of the obligation object based on the lender amount received at 328.

At 336, the obligation object tokenizes the lender balance and the borrower balance by generating at least one lender token and at least one borrower token, respectively. In some cases, a plurality of lender tokens or a plurality of borrower tokens, or both, may be generated. Some lender or borrower tokens may be generated at later stages, also. In some cases, tokens may be subdivisible by users. Generating the at least one lender token may involve generating a lender ledger to track the positions of each lender associated with the obligation object. Likewise, generating the at least one borrower token may involve generating a borrower ledger to track the positions of each borrower associated with the obligation object.

In some alternative embodiments, generation of at least one lender token, at least one borrower token, or both, may be omitted. Instead, the obligation object may record one or more addresses associated with the lender, borrower, or both. Each address may be have corresponding values associated therewith, representing the respective lender balance or borrower balance, as the case may be. The one or more addresses may be recorded in at least one ledger used for this purpose, and the addresses and values may be updated over time thereafter.

At 340, the at least one lender token is associated with the first lender address, for example by transferring the at least one lender token to the first lender address in a transaction. In embodiments where lender tokens are not generated, the transfer may be carried out by recording the first lender address in a ledger and updating a value associated with the first lender address (e.g., to equal the lender balance).

At 344, the at least one borrower token is associated with the first borrower address, for example by transferring the at least one borrower token to the first borrower address in a transaction. In embodiments where borrower tokens are not generated, the transfer may be carried out by recording the first borrower address in a ledger and updating a value associated with the first borrower address (e.g., to equal the borrower balance).

At 348, the obligation object determines one or more predetermined interest rate. In some cases, the predetermined interest rate may be the same for both the lender and borrower. However, in other cases, the predetermined interest rates may differ for the lender and borrower. For example, there may be a first predetermined interest rate for the borrower and a second predetermined interest rate for the lender. The predetermined interest rates may be determined, for example, automatically based on an extrinsic rate such as the LIBOR etc.), based on a dividend rate for stocks or synthetic stocks, or by querying an external server such as external server 150. In some cases, the query may be a transaction to another smart contract. Alternatively, the predetermined interest rates may be determined based on an intrinsic rate in embodiments where it is used. In other cases, the predetermined interest rates may be parameters provided by one or more parties when the obligation object is created or funded. In at least some embodiments, the predetermined interest rate is fixed for the duration of the obligation object.

The method 300 may continue with execution of the obligation object's transaction subroutine, as shown in method 350 of FIG. 3B. The transaction subroutine may be triggered, for example, by a party that sends a transaction to the obligation object, causing one or more nodes of the system to execute the transaction subroutine. The transaction may be a funds transfer transaction, a query transaction, an update transaction, a trigger transaction or some other transaction.

At 354 of FIG. 3B, the transaction is received and the transaction subroutine begins to execute.

At 356, the obligation object may determine whether an extrinsic rate such as the Dai Savings Rate or Stability Fee (or its equivalent for platforms other than Maker) has changed, for example by querying an external server such as external server 150, or a blockchain node. In some cases, the query may be a transaction to another smart contract. Alternatively, the intrinsic rate may be determined in embodiments where it is used.

At 358, the obligation object determines whether the transaction is a funds transfer transaction initiated, e.g., by the holder of the at least one borrower token. If yes, the borrower balance is updated based on the payment at 366. The funds transfer may be a first payment, which can be at least one borrower interest payment, based on the first variable interest rate of the first smart contract.

At 370, the obligation object determines whether a triggering event has occurred. A triggering event may occur, for example, in response to a trigger transaction (e.g., a query), in response to determining that a borrower balance exceeds the collateral value, or in response to determining that the term of the obligation object has expired or elapsed. A triggering event may also be a determination that the extrinsic rate has changed.

In response to detection of the triggering event, the obligation object may perform further processing at 374, and proceed to 382 of FIG. 3C to perform further processing as shown in method 380 of FIG. 3B. Otherwise, the obligation may await a further transaction, whereupon it may return to 354. In this way, the obligation object may periodically monitor and process a plurality of payments.

At 382, the obligation object determines whether the lender balance exceeds the collateral value associated with the first smart contract. If the lender balance is within a predetermined threshold value of the collateral value, then the obligation object may proceed to liquidation at 384 and terminate the obligation object at 388, as described further herein. For example, if the predetermined threshold is set to 105% of the collateral value, and if the lender balance is less than 105% of the collateral value, then liquidation may be initiated. In some embodiments, the obligation object may determine whether the borrower balance exceeds the collateral value associated with the first smart contract. If the borrower balance is within a second predetermined threshold value of the collateral value, then the obligation object may proceed to liquidation at 384 and terminate the obligation object at 388, as described further herein.

At 386, the obligation object determines whether the term of the obligation object has expired, in which case it may proceed to terminate at 388.

At 390, the obligation object compares the extrinsic rate to the predetermined interest rate.

If the extrinsic rate has increased relative to the predetermined interest rate, then at 396 the borrower balance may be increased by an adjustment amount to compensate for the change in interest rate (which would otherwise cause the lender to receive more than the predetermined interest rate, and likewise cause the borrower to be charged more than the predetermined interest rate) and the lender balance may be decreased by the equivalent adjustment amount. Optionally, the obligation object may immediately transfer the adjustment amount to a separate account allocated to the borrower at 398. The adjustment amount may be based on the difference between the extrinsic rate and the predetermined interest rate.

In some cases, the adjustment amount may be automatically transferred immediately or in increments, or both, to the first smart contract, to prevent inadvertent liquidation of the first smart contract in the event that the extrinsic rate increases.

If the extrinsic rate has decreased relative to the predetermined interest rate, then at 392 the lender balance may be increased by an adjustment amount to compensate for the change in interest rate (which would otherwise cause the borrower to be charged less than the predetermined interest rate, and likewise cause the lender to accrue less than the predetermined interest rate) and the borrower balance may be decreased by the equivalent adjustment amount.

Optionally, the obligation object may immediately transfer the adjustment amount to a separate account allocated to the lender (not shown), which may be considered an escrow account. As above, the adjustment amount may be based on the difference between the extrinsic rate and the predetermined interest rate.

The adjustment amount may be obtained by performing a partial or full liquidation of the collateral, and releasing and transferring the liquidated portion of the collateral from the CDP smart contract to the separate account.

In some embodiments, the obligation object instead may withdraw new (i.e., additional) Dai from the CDP smart contract, assuming that there is collateral remaining which is sufficient to support the generation or withdrawal of additional Dai (e.g., if the collateralization ratio, or loan-to-value ratio has not been exhausted previously).

By way of example, if collateral valued at 100 Dai is held by the CDP smart contract, and only 30 Dai has been withdrawn from the CDP smart contract, then it may be possible to withdraw additional Dai without triggering a liquidation of the entire CDP smart contract (e.g., an additional 10 Dai may be withdrawn if the collateralization ratio is 3:2). Note that the liquidation threshold may, in some cases, be different than the collateralization ratio (e.g., the threshold may allow collateralization as low as 1:1).

Withdrawal of additional Dai causes the CDP smart contract to move closer to meeting the liquidation threshold, and may be considered another form of partially liquidating the CDP smart contract.

Any additional Dai received according to the above approaches may be transferred to the above-mentioned escrow account to ensure that the lender balance is maintained and sufficient interest can be paid to the lender.

At 394, the obligation object may determine whether the lender balance exceeds the collateral value associated with the first smart contract. If the lender balance is within a predetermined threshold value of the collateral value, then the obligation object may proceed to liquidate at 384, and terminate at 388. For example, if the predetermined threshold is set to 105% of the collateral value, and if the lender balance is less than 105% of the collateral value, then liquidation may be initiated.

Otherwise, the method may return, or await further execution cycles at 354.

Terminating or liquidating the obligation object at 388 may involve computing a lender return amount based on the lender balance and the at least one first payment, computing a borrower return amount based on the borrower balance and the at least one first payment, and releasing a cryptocurrency based on the lender return amount and the borrower return amount. Releasing the cryptocurrency may involve transferring the lender return amount to the holder of the at least one lender token in a transaction (or the address of the lender(s)), and transferring the borrower return amount to the holder of the at least one borrower token (or the address of the borrower(s)). In some embodiments, the lender return amount and the borrower return amount may also be computed based on outstanding obligation tokens, as described herein, and at least a portion of the lender return amount or borrower return amount, or both, may be allocated to addresses holding outstanding obligation tokens.

In some embodiments, termination of the obligation object 388 may involve an auction process, which may permit interested users to bid on the assets held by the obligation object (e.g., borrower balance, lender balance). Following the conclusion of the bidding process, the winners send the winning bid amounts and receive control of the relevant assets in exchange. However, in some embodiments, bidders may receive only a subset of the assets, those subsets computed by determining and subtracting amounts owed to other parties according to the obligation object (e.g., amounts owed to the lender or borrower, holders of secondary tokens, etc.), who may receive control of the relevant assets prior to—or concurrently with—the auction winners.

When computing interest rates, the obligation object 388 may compute interest amounts by using predetermined interval compounding (e.g., annual, monthly, daily, etc.) or, in some cases, may compute interest amounts using continuous compounding. For instance, the Maker DAO Stability Fee is calculated using continuous compounding.

To compute interest using continuous compounding, the following formula may be used:

$$Pe^{rt} - P = A$$

Where P is the principal investment amount (e.g., the initial deposit or loan amount), r is the annual interest rate (in decimal form), t is the number of years the funds have been invested, e is Euler's number, and A is the interest amount.

To aid understanding, some examples of the execution of the obligation object are provided next. In these examples, it may be assumed that the extrinsic rate (e.g., DSR) is 2% annual interest, and the predetermined interest rate is fixed at 3% annually. The collateral value associated with the at least one loan token is assessed at 1000 currency units (e.g., dollars), and the lender amount is also 1000 currency units. To ease understanding, annual compounding is used, however other types of compounding may be used in practice, including continuous compounding, which would result in different computation results.

In a first example, one month after initiation of the obligation object, there has been no adjustment in the extrinsic rate, which remains at 2% annually. In this case, the borrower is obligated to transfer value to the lender, to make up for the difference between the predetermined interest rate (3% annually) and the DSR (which remains at 2% annually). The obligation object can account for this value transfer simply by updating the borrower balance when it is next executed (e.g., upon receipt of a query transaction or other transaction). The payment is not due immediately, but may be required to be paid in order to release the collateral held by the obligation object.

Alternatively, in some embodiments, the payment may be effected immediately and/or in small increments by invoking a partial liquidation of a corresponding portion of the collateral held by the obligation object, transferring control of the corresponding portion to the obligation object, and updating the lender balance of the obligation object accordingly. In some cases, the collateral may be partially liquidated and a corresponding portion of the collateral released from the CDP smart contract to be held in escrow. Alternatively, additional Dai may be created and withdrawn from the CDP smart contract (e.g., if the collateralization ratio permits) and likewise held in escrow. Such adjusting transactions can be made each time an updating function of the obligation object is executed, e.g., on a daily basis.

Continuing the example, in the second month after initiation of the obligation object, the extrinsic rate rises to 4% annually. In this case, the lender is obligated to transfer value to the lender, to make up for the difference between the predetermined interest rate (3% annually) and the DSR (which is now at 4% annually). As before, the obligation object can account for this value transfer simply by updating the borrower balance when it is next executed (e.g., upon receipt of a query transaction or other transaction) and, in this case, the borrower balance would equalize.

Continuing the example further, in the third month after initiation of the obligation object, the extrinsic rate rises to 15% annually. In this case, the lender is again obligated to transfer value to the lender, to make up for the difference between the predetermined interest rate (3% annually) and the DSR (which is now at 15% annually). The difference between the predetermined interest rate is 12% annually, or 1% per month. Therefore, the obligation object can account for this value transfer by updating the borrower balance by 1% of the lender amount for the third month, when it is next executed (e.g., upon receipt of a query transaction or other transaction).

If the obligation object is terminated after the third month, 1% of the lender amount, or 10 units, would be transferred to the borrower address, or to the first smart contract.

In a second example, immediately after the obligation object is instantiated, the extrinsic rate falls to zero, where it remains for one month. If the obligation object is terminated after one month, the borrower must transfer the difference between the predetermined interest rate (3% annually) and the extrinsic rate (0%)—i.e., 3/12% of the lender amount—to the obligation object (or, in some cases, to the lender address), in order for the obligation object to release control of the at least one loan token (and the collateral).

In a third example, immediately after the obligation object is instantiated, the extrinsic rate rises to 23% and stays there for a year. During that time the collateral object associated with the first smart contract drops significantly in value, such that the collateral value is approaching the liquidation price (e.g., collateral value less the owed amount value) of the first smart contract, which may cause the first smart contract to be terminated. However, since the obligation object sets a predetermined interest rate for both parties, the first smart contract should not be liquidated. In this case, the obligation object may transfer funds under its control to the first smart contract, to prevent liquidation of the first smart contract. In this scenario, the lender is effectively paying down the debt of the borrower prior to expiry of the obligation object, in order to maintain the first smart contract in effect.

In a fourth example, the extrinsic rate stays at 2% for one year following instantiation of the obligation object, however the collateral value of the first smart contract falls by 95%. Ownership of the first smart contract is then transferred to a third party, which closes the first smart contract and returns the collateral object to the holder of the at least one loan token, which is the obligation object. Accordingly, the obligation object can then use the collateral object to pay the lender the additional 1% interest above the extrinsic rate (2%) required to achieve the 3% predetermined rate. Any remaining amount of the collateral object, if any, can be returned to the borrower.

Figure 4:
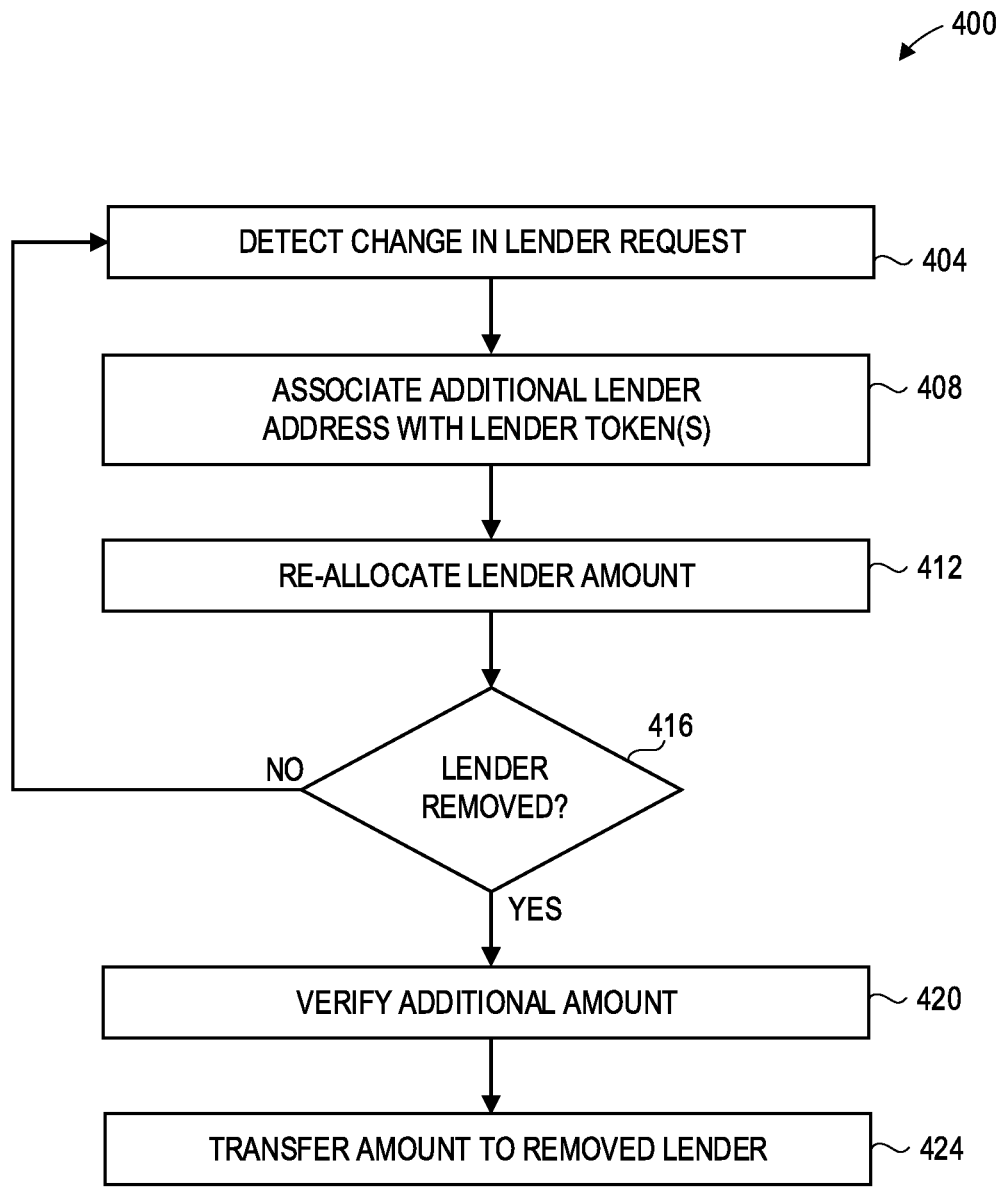
FIG. 4 is a process flow diagram of a method of changing at least one or more lenders associated with an obligation object.

Referring now to FIG. 4, there is illustrated an example process flow diagram of a method of changing at least one or more lenders associated with an obligation object.

Method 400 may begin at any time following the creation of an obligation object, and begins with the obligation object receiving a request for change in lender at 404. The request may be a transaction, and may identify the addresses of the additional lender or lenders to be introduced and include their respective shares of the loan amount (to replace any amount that may be withdrawn by another lender).

At 408, the obligation object associates the additional lender addresses with the lender tokens internally. For example, a subset of the plurality of existing lender tokens may be associated with a second lender address.

At 412, the lender amount can be re-allocated between the first lender address and the second lender address—and any additional lender addresses—according to a proportion of the plurality of lender tokens associated with the first and second (and additional) lender addresses. The proportion of allocation can be verified with reference to holdings of the lender tokens as recorded in the blockchain and cross-checked against any loan amount received as part of the change transaction.

In some cases, the original or existing lenders may also be removed as part of the request, in which case the transaction identifies the lenders to be removed.

At 416, the obligation object determines if a lender is to be removed or de-associated. If yes, then the obligation object can internally de-associate the at least one lender token from the first lender address and determine a subset of the loan amount to be returned to the first lender address. The obligation object may, optionally, verify that it has received one or more secondary loan amount at 420, to replace the subset of the loan amount.

The subset of the loan amount may be transferred to the first lender address at 424.

In some embodiments, the subset of the loan amount may not be transferred to the first lender address (or other removed lender) immediately. Instead, the one or more obligation tokens may be generated and transferred to the first (or other) lender address. In such embodiments, the one or more obligation tokens that are outstanding upon the liquidation or other termination of the obligation object, are tabulated and used by the obligation object to apportion the loan amount.

Figure 5:
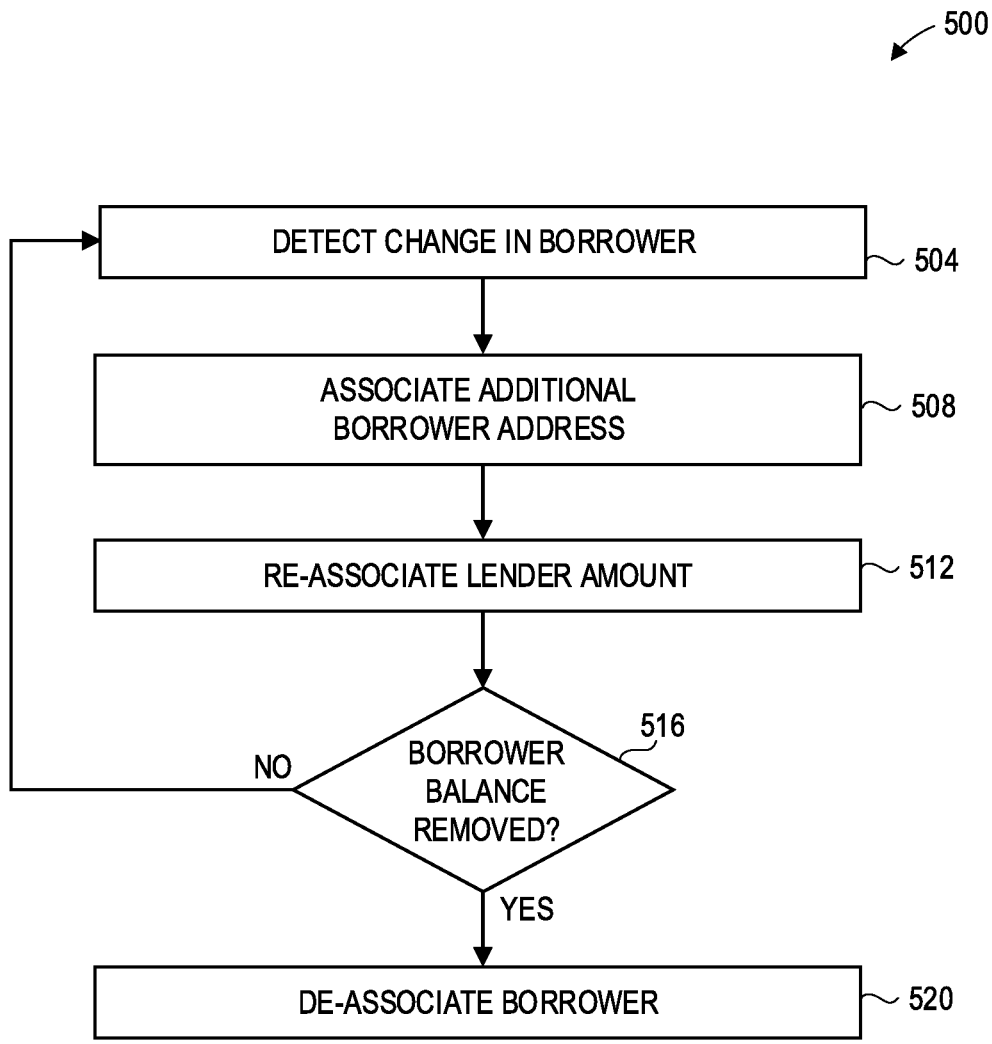
FIG. 5 is a process flow diagram of a method of changing at least one or more borrowers associated with an obligation object.

Referring now to FIG. 5, there is illustrated an example process flow diagram of a method of changing at least one or more borrowers associated with an obligation object.

Method 500 may begin at any time following the creation of an obligation object, and begins with the obligation object receiving a request for change in borrower at 504. The request may be a transaction, and may identify the addresses of the additional borrower or borrowers to be introduced and include their respective shares of the borrower balance.

At 508, the obligation object associates the additional borrower addresses with the borrower tokens internally. For example, a subset of the plurality of existing borrower tokens may be associated with a second borrower address.

At 512, the borrower balance can be re-allocated between the first borrower address and the second borrower address—and any additional borrower addresses—according to a proportion of the plurality of borrower tokens associated with the first and second (and additional) borrower addresses. The proportion of allocation can be verified with reference to holdings of the borrower tokens as recorded in the blockchain.

In some cases, the proportion of the borrower balance that belongs to the original or existing borrowers may be reduced to zero as part of the request, in which case the corresponding borrowers can be removed.

At 516, the obligation object determines if a borrower can be removed or de-associated. If yes, then the obligation object can internally de-associate the at least one borrower token from the first borrower address at 520. In at least some embodiments, the obligation object may transfer a portion of the lender amount to the first smart contract to reduce the owed amount value.

As in method 400, in some embodiments, the subset of the loan amount may not be transferred to the first lender address (or other removed lender) immediately. Instead, the one or more obligation tokens may be generated and transferred to the first (or other) lender address. In such embodiments, the one or more obligation tokens that are outstanding upon the liquidation or other termination of the obligation object, are tabulated and used by the obligation object to apportion the loan amount.

As described herein, at least some of the described embodiments may be used as a collateral management system for a plurality of users. For example, the described systems and methods may be used to permit lenders to transfer their positions to new lenders in a trustless fashion and without the requirement for an intermediary or counterparty. The existing lender may then withdraw the loan amount. In some cases, the extrinsic rate (e.g., DSR) may differ when a lender transfers its position to a new lender. In such cases, the original lender may continue to accrue interest at the original rate, and this accrued interest may be represented in the form of secondary tokens, or interest tokens, which represent an entitlement to the difference between the original predetermined rate at the time the obligation object was generated and the new predetermined rate for the new lender. Interest due to holders of the secondary tokens may accrue over time, or may be calculated when the secondary tokens are redeemed. In some cases, the obligation object may generate the secondary tokens. In some embodiments, the secondary tokens may be the same type of token as provided to the initial lender. In some cases, the "token" may simply be an account associated with a balance. This transfer process may be repeated for additional lenders.

As part of such transfers between lenders, counterparty risk can be reduced or eliminated by the replenishment of collateral when an existing lender sells its position to a new lender.

Figure 7:
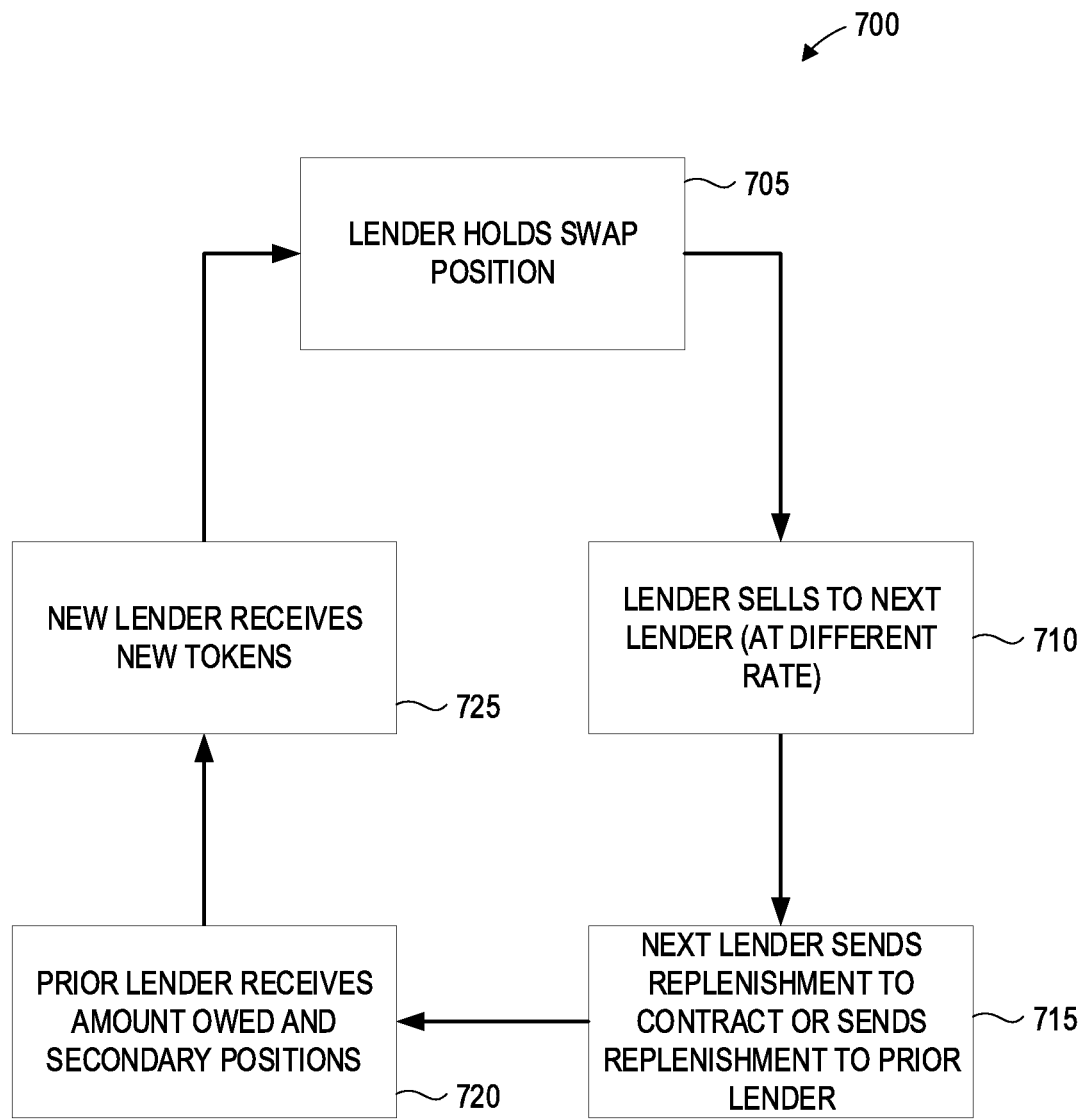
FIG. 7 is a process flow diagram for an example method of transferring lenders associated with an obligation object in accordance with some embodiments.

Referring now to FIG. 7, there is illustrated an example method of transferring lenders associated with an obligation object, in accordance with some embodiments. Method 700 may be carried with an existing obligation object, as described herein.

At 705, a lender holds a CFRA position (e.g., in the form of lender tokens) in an obligation object.

At 710, the lender determines that it wishes to transfers its lender tokens to a new lender, and transmits a transfer request to the obligation object. The transfer request identifies an amount of lender tokens to be transferred, a new predetermined rate, a new lender address and may be signed by the existing lender. The obligation object may, in some cases, determine that the new predetermined rate differs from the original predetermined rate.

At 715, the obligation object determines an amount of the loan amount that will be replenished as part of the transfer. In some cases, the replenishment may be carried out by the obligation object receiving a suitable amount (e.g., twice the loan amount plus or minus any interest accrued or other adjustments owed to or by the existing lender, so that the existing lender can be reimbursed). In some other cases, the replenishment may be carried out by the existing lender receiving a suitable amount from the new lender (e.g., the reimbursement amount), and notifying the obligation object of the transaction.

At 720, the obligation object confirms that it has received a replenishment amount and sends the reimbursement amount to the existing lender, if required. Alternatively, the obligation object confirms that the existing lender has received the reimbursement amount from the new lender. The obligation object then generates secondary tokens representing the difference between the original predetermined rate and the new predetermined rate, and transfers the newly-generated secondary tokens to the existing lender.

At 725, the obligation object generates new lender tokens, representing ownership of the loan amount, and transfers the newly-generated lender tokens to the new lender address. The new lender then becomes the existing lender.

Method 700 may then return to 705, if the most recent existing lender wishes to transfers its position to a still newer lender.

In some embodiments, analogous systems and methods may be used to permit borrowers to transfer their positions to new borrowers.

To illustrate how method 700 may be executed several times successively, an example scenario is shown in Table 1. In this example, the first amount $X_1$, second amount $X_2$ and third amount $X_3$ are related as follows:

$$X_3 \leq X_1 \leq X_2$$

It will be appreciated that the specific values of $X_1$, $X_2$ and $X_3$ can differ in each transaction (e.g., since the interest rate and initial amounts can vary), although the above relation generally will be observed so long as interest rates do not decrease and/or become negative.

TABLE 1

| Time | Event | Consequence |
|---|---|---|
| t = 0 | Lender 1 deposits a first amount of DAI, $X_1$; Borrower deposits CDP valued at or about $X_1$ DAI; Predetermined rate set at 4% (equal to DSR). | |
| t + 1 day | DSR decreases to 2%. | Obligation object will continue to accrue 4% interest on $X_1$ DAI for Lender 1. |
| t + 180 days | Lender 1 transfers position to Lender 2; New predetermined rate set at 2%; Lender 2 transfers approximately $X_1$ DAI to Lender 1 OR transfers $X_2$ DAI to obligation object; Obligation object generates secondary tokens and transfers to Lender 1; obligation object generates new lender tokens and transfers to Lender 2. | Obligation object notes transfer OR transfers reimbursement amount to Lender 1. Lender 2 is now the only lender. |
| t + 181 days | DSR increases to 8%. | Obligation object will continue to accrue (4 − 2) = 2% interest on $X_1$ DAI for Lender 1; obligation object will continue to 2% interest on $X_2$ DAI for Lender 2. |
| t + 240 days | Lender 2 transfers partial position to Lender 3; New predetermined rate set at 8%; Lender 3 transfers $X_3$ DAI (plus accrued interest) to Lender 2 OR transfers approximately $X_2 - X_1 - X_3$ DAI plus accrued interest to obligation object; Obligation object generates additional secondary tokens and transfers to Lender 2; obligation object generates new lender tokens and transfers to Lender 3. | Obligation object notes transfer OR transfers reimbursement amount to Lender 2. |
| t + 270 days | DSR decreases to 4%. | Collateral of borrower drops significantly prompting liquidation; obligation object terminates and transfers payouts to Lenders 1, 2 and 3 (Lender 1 receives interest accrued in the six months after transferring position to Lender 2 at a lower rate; Lender 2 receives a large part of loan amount back plus amount lost by selling at a higher rate; Lender 3 receives almost all of its loan amount back). |

As noted above, in some embodiments, lender or borrower tokens, or both, may not be generated. In such embodiments, in lieu of generating and transferring tokens, the obligation object may track obligations by recording addresses associated with borrowers and lenders, and thereafter updating values associated with each address.

Referring now to FIGS. 8A to 8D, there are illustrated process flow diagrams for methods of administrating obligation objects in accordance with at least some embodiments. Process flows 800a, 800b, 800c and 800d can be carried out by the elements of system 100, for example. In particular, borrower device 830 may be analogous to a borrower device 130a, 130b, etc., while lender device 840 may be analogous to a lender device 140a, 140b, etc.

A monitoring server 802 may be an external server, such as external server 150 or an intermediary device, such as intermediary device 160. Monitoring server 802 may execute a periodic monitoring function (known as "cron" in some embodiments), to initiate portions of flow 700, as described further herein.

Dai smart contract 812 is a smart contract executed by one or more nodes of a blockchain, such as nodes 120 of system 100, to implement and operate the Dai cryptocurrency.

CFRA administrative smart contract 814 is a smart contract executed by one or more nodes of a blockchain, such as nodes 120 of system 100, to implement the CFRA as described herein. CFRA administrative smart contract 814 generally operates to track and monitor the creation and completion of individual obligation objects, which can be deployed as separate smart contracts.

Obligation object 816 may be an individual CFRA smart contract, which may be a smart contract created by CFRA administrative smart contract 814.

Wrapper contract 818 is a smart contract that interfaces with a CDP smart contract on behalf of the obligation object 816, and allows the obligation object 816 to execute certain functions such as checking a DSR, unlocking Dai within the CDP, terminating the CDP, etc.

Proxy contract 808 is a smart contract that interfaces with a CDP smart contract on behalf of the Maker DAO organization, and permits the Maker DAO organization to administer the CDP as described elsewhere herein.

Figure 8A:
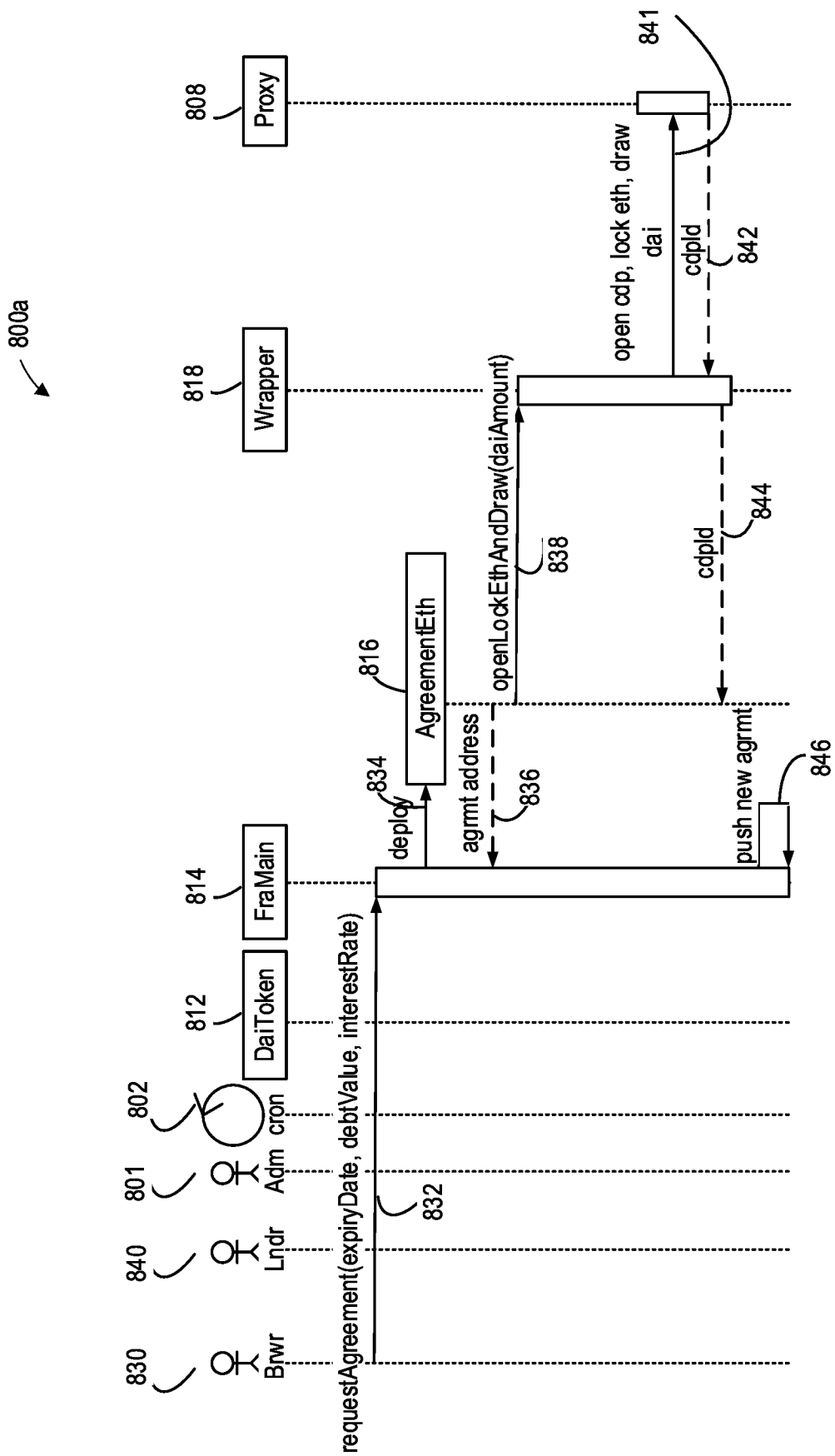
FIGS. 8A to 8D are process flow diagrams illustrating the creation of obligation objects in accordance with some embodiments.

Referring now to FIG. 8A, there is shown a process flow 800a for a method of creating an obligation object in accordance with some embodiments.

Flow 800*a* begins at 832 with a borrower device 830 transmitting a request to the CFRA administrative smart contract 814, to create a new obligation object. The request may specify an expiration date, a collateral value, a debt value and a predetermined interest rate for the obligation object.

At 834, the CFRA administrative smart contract 814 creates and instantiates the obligation object 816, and returns the address of the obligation object at 836.

At 838, the obligation object 816 transmits a request to create a new CDP, lock a cryptocurrency amount (e.g., Ether) and draw a corresponding Dai amount. That is, the deposit of cryptocurrency as collateral in the Maker system triggers a function to create Dai which can be drawn upon.

In response to the request, at 841, the wrapper 818 transmits a request to proxy 808 to create the new CDP, lock the cryptocurrency amount and draw the Dai amount.

Upon creation of the CDP, the proxy responds at 842 with the identifier of the CDP, which the wrapper returns to the obligation object at 844.

At 846, the CFRA administrative smart contract 814 may publish the existence of the new obligation object, for example in response to request for lists of obligation objects with unmatched lenders and borrowers, to thereby enable lenders to identify obligation objects in which they wish to participate.

Figure 8B:
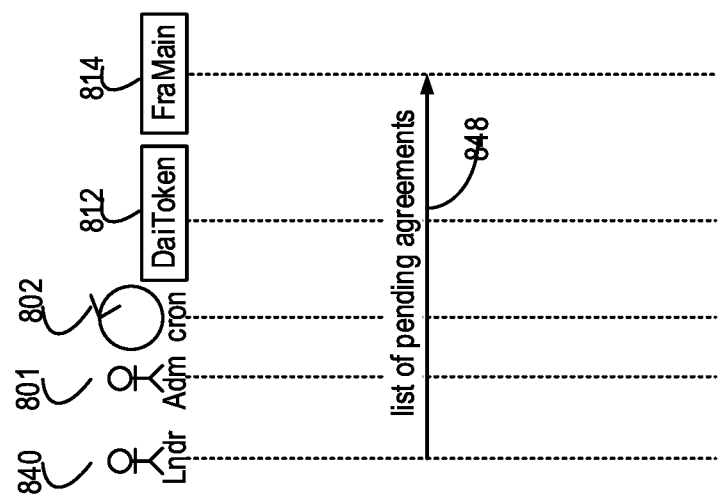

Referring now to FIG. 8B, there is shown a process flow 800*b* for a method of viewing a list of obligation objects in accordance with some embodiments.

Flow 800*b* may be carried out by a lender device 840, which may send a request at 848 for a list of pending or unmatched obligation objects to the CFRA administrative smart contract 814. The CFRA administrative smart contract may respond to the request accordingly.

Figure 8C:
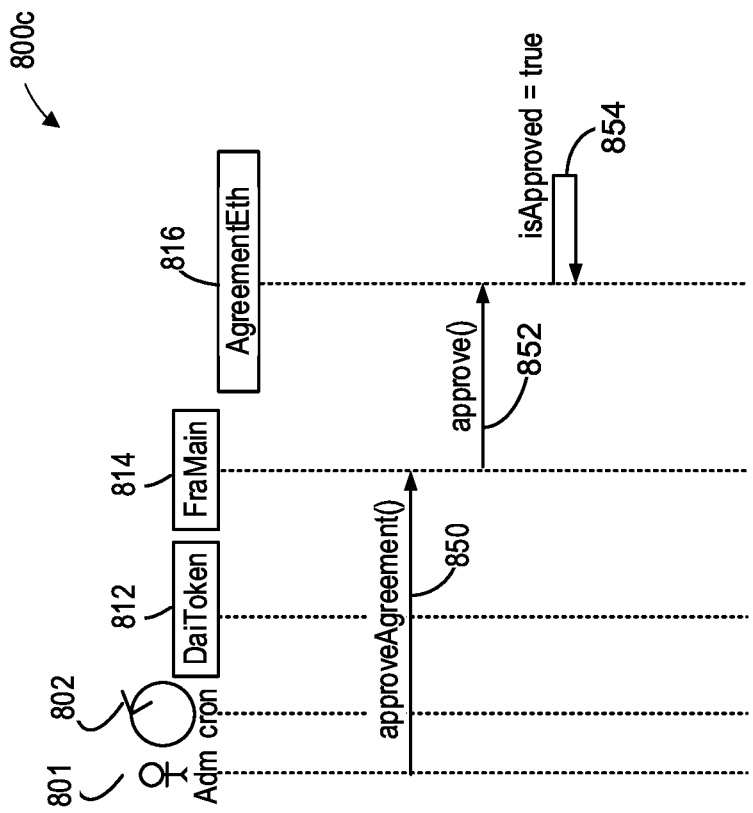

Referring now to FIG. 8C, there is shown a process flow 800*c* for a method of administrative approval for obligation objects in accordance with some embodiments.

Optionally, in some embodiments, administrative approval may be required for each newly-created obligation object. In such cases, an administrator 801 may review each obligation object and, when satisfied that the obligation object is acceptable, transmit an approval at 850 to the CFRA administrative smart contract, which may notify the obligation object 816 of the approval at 852. The obligation object 816 may subsequently change its state to approved at 854.

Figure 8D:
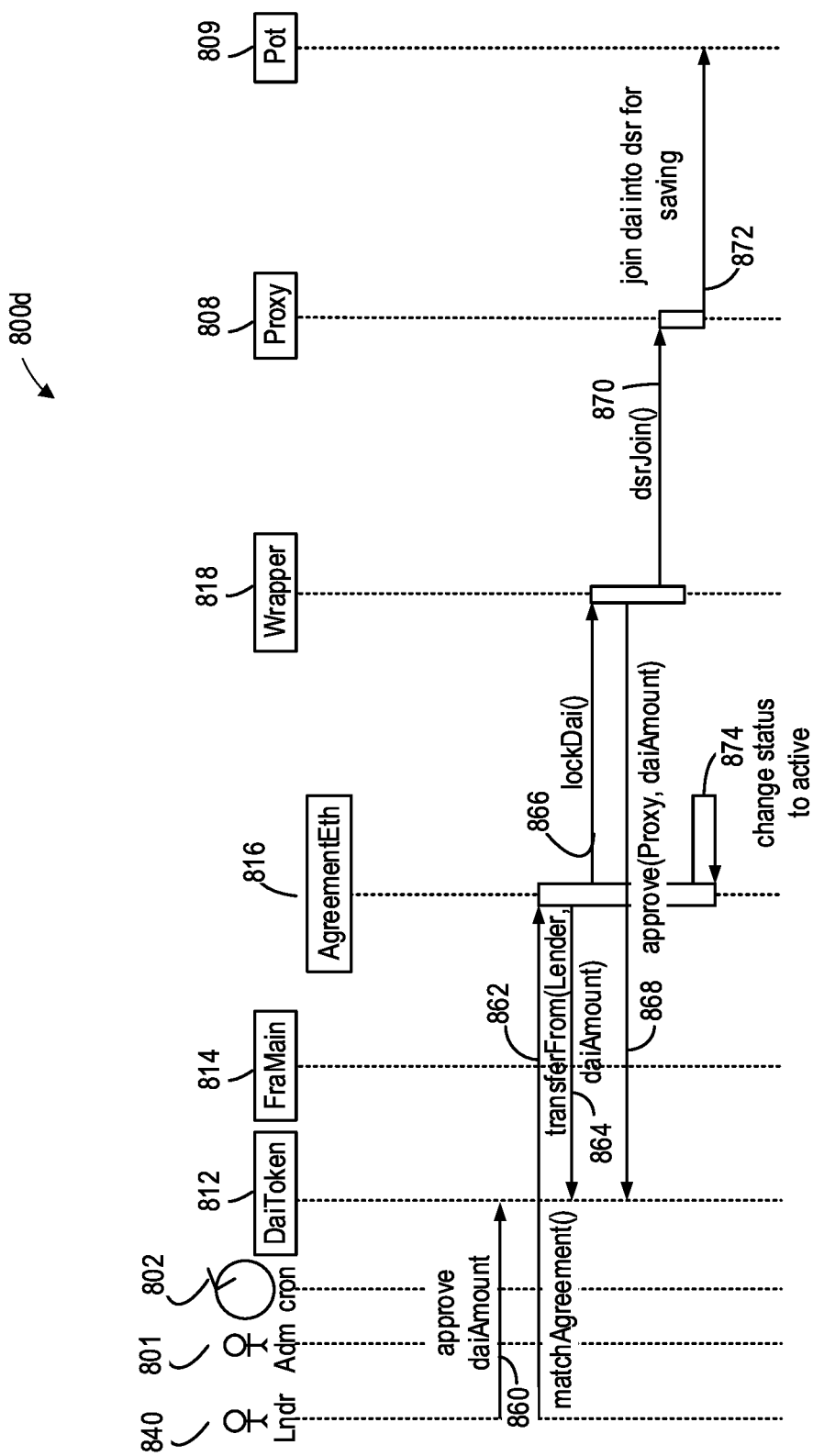

Referring now to FIG. 8D, there is shown a process flow 800*d* for a method of accepting an obligation object for a lender.

At 860, the lender device 840 approves the amount of Dai to be transferred based on the obligation object and transmits the approval for release of the Dai to the Dai smart contract 812. At 862, the lender device also transmits an agreement request to the obligation object 816. The agreement request may contain an authorization to control the agreed-upon amount of Dai.

In response to the agreement request, the obligation object 816 transmits a confirmation to the Dai smart contract at 864. The confirmation may include a lender identifier or address and the lending amount.

At 866, the obligation object 816 transmits a Dai lock request to the wrapper 818, which sends an approval to the Dai smart contract 812 with an identification of proxiy 808 and the requested amount, at 868. The wrapper 818 also registers the locked Dai with the proxy 808 at 870, which forwards the registration at 872, to ensure that the Dai accrues interest according to the DSR.

At 874, the obligation object 816 updates its state to active.

Figure 9:
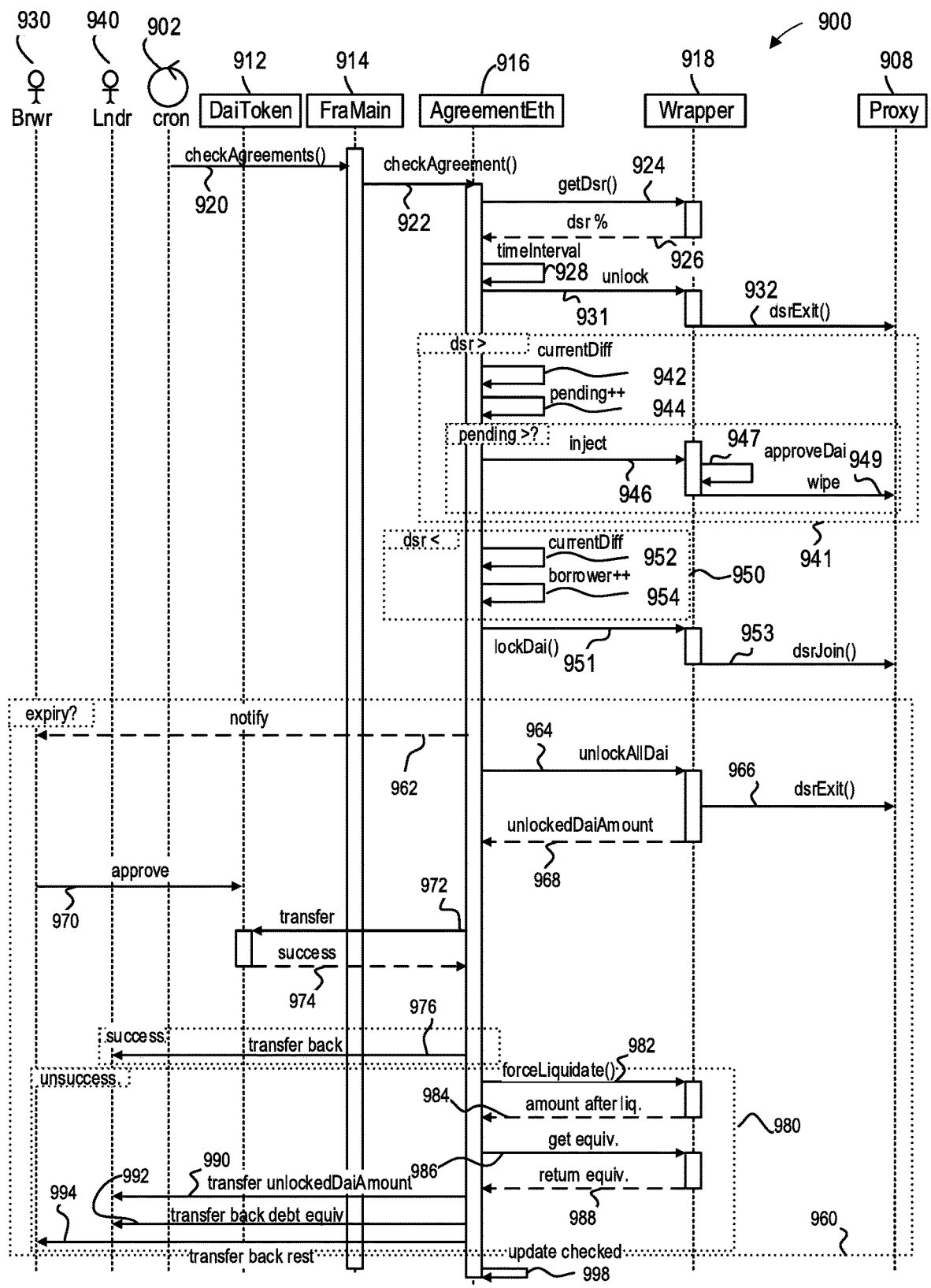
FIG. 9 is a process flow diagram illustrating methods of conducting transactions in accordance with at least some embodiments.

Referring now to FIG. 9, there is illustrated a process flow diagram illustrating methods of conducting transactions in accordance with at least some embodiments. Process flow 900 can be carried out by the elements of system 100, for example. In particular, borrower device 930 may be analogous to a borrower device 130*a*, 130*b*, etc., while lender device 940 may be analogous to a lender device 140*a*, 140*b*, etc.

A monitoring server 902 may be an external server, such as external server 150 or an intermediary device, such as intermediary device 160. Monitoring server 902 may execute a periodic monitoring function (known as "cron" in some embodiments), to initiate portions of flow 900, as described further herein.

Dai smart contract 912 is a smart contract executed by one or more nodes of a blockchain, such as nodes 120 of system 100, to implement and operate the Dai cryptocurrency.

CFRA administrative smart contract 914 is a smart contract executed by one or more nodes of a blockchain, such as nodes 120 of system 100, to implement the CFRA as described herein. CFRA administrative smart contract 914 generally operates to track and monitor the creation and completion of individual obligation objects, which can be deployed as separate smart contracts.

Obligation object 916 may be an individual CFRA smart contract, which may be a smart contract created by CFRA administrative smart contract 914.

Wrapper contract 918 is a smart contract that interfaces with a CDP smart contract on behalf of the obligation object 916, and allows the obligation object 916 to execute certain functions such as checking a DSR, unlocking Dai within the CDP, terminating the CDP, etc.

Proxy contract 908 is a smart contract that interfaces with a CDP smart contract on behalf of the Maker DAO organization, and permits the Maker DAO organization to administer the CDP as described elsewhere herein.

Process flow 900 begins at 920 with monitoring server 902 issuing a check agreement request to the CFRA administrative smart contract 914. The request may be issued in response to a user input, or as a periodic check at a predetermined interval.

At 922, CFRA administrative smart contract 914 processes the check agreement request and sends individual check agreement requests to each obligation object 916 it has created (or been configured to monitor).

At 924, in response to the check agreement request, each obligation object 916 requests the current DSR from wrapper contract 918 for the CDP associated with the obligation object 916. The wrapper contract 918 returns the current DSR at 926.

At 928, the obligation object 916 determines the length of time that has elapsed since the last check was performed, and issues a request to the wrapper contract 918 to unlock all Dai held by the CDP, at 931.

If the DSR is presently greater than the predetermined interest rate associated with the obligation object 916, then subflow 941 is executed. If the DSR is presently greater than the predetermined interest rate associated with the obligation object 916, then subflow 950 is executed. If the DSR is equal to the predetermined interest rate, then either subflow 941 or subflow 950, or none, may be executed, depending on how the system is configured.

When subflow 941 is executed, obligation object 916 computes a current difference between the DSR and interest rate at 942. The current difference may be computed using, e.g., the formula:

$$currentDifference = debtValue * (currentDSR - interestRate) * timeInterval / minsInYear$$

Where debtValue is the present value of the debt held in the CDP, interestRate is the predetermined interest rate, timeInterval is the interval computed at 928, and minsInYear is the number of minutes in one year (in some embodiments, other granularities may be used).

At 944, a pending injection amount (required of the lender to update the lender balance) is updated based on the current difference computed at 942. If the pending injection amount exceeds a predetermined injection threshold, then at 946, the obligation object 916 instructs the wrapper 918 to transfer the pending injection amount to the CDP, which the wrapper 918 does at 947, before notifying the proxy 908 of the injection, at 949. Use of the predetermined injection threshold enables the obligation object 916 to avoid updating the CDP each time a check occurs, which may incur transaction and computing costs.

When subflow 950 is executed, obligation object computes a current difference between the DSR and interest rate at 952 (using, e.g., the same formula as at 942), and updates the borrower balance accordingly at 954.

At 951, the obligation object 916 may request the wrapper 918 to lock the Dai amount in the CDP once again, and the wrapper 918 may do so at 953 and notify the proxy 908 accordingly.

When an expiry date of the obligation object 916 has been reached, an expiry or liquidation subflow 960 may be executed.

Optionally, subflow 960 may begin at 962 with the obligation object 916 requesting that the borrower device 930 confirm a Dai smart contract address that will supply the required amount to account for the borrower balance. In some cases, this action may be carried out before the expiry date.

At 964, obligation object 916 requests wrapper 918 to unlock all Dai held in the CDP. Wrapper 918 executes a liquidation routine and notifies proxy 908 of the request at 966.

At 968, wrapper 918 may, optionally, notify obligation object 916 of the amount of Dai that has been unlocked.

At 970, borrower device 930 confirms the Dai smart contract address to supply the required funds to account for the borrower balance, and executes a transfer function of the Dai smart contract 912. Optionally, the borrower device 930 may elect not to supply a Dai smart contract address, or not to return the borrower balance (which may result in loss of control of the CDP, and thus the collateral held by the CDP).

At 972, the obligation object requests the borrower balance amount of Dai from the Dai smart contract 912 and the borrower balance amount may be transferred back from the Dai smart contract 912, at 974.

At 976, in response to successful receipt of the borrower balance amount, the obligation object 916 transfers the unlocked Dai amount from the CDP and the borrower balance amount to the lender device 940 (or an address designated by the lender device 940).

In cases where the borrower balance amount is not received at 974 (e.g., because the borrower did not approve the release of Dai to pay off the borrower balance), then subflow 980 may be executed.

Subflow 980 begins at 982, with the obligation object 916 requesting liquidation of the CDP via wrapper 918. Wrapper 918 carries out the liquidation function of the CDP, and optionally notifies obligation object 916 of the funds amount available following liquidation, at 984.

At 986, obligation object 916 requests transfer of the funds amount following liquidation. At 988, wrapper 918 transfers the liquidation amount (which may be generated by sale of the collateral) to obligation object 916.

At 990, obligation object 916 transfers the unlocked Dai amount to the lender device 940 (or a designated address).

At 992, obligation object 916 transfers the borrower balance to the lender device 940 (or a designated address) or, if the liquidation amount is less than the borrower balance, transfers the liquidation amount.

If the liquidation amount exceeds the borrower balance, then the difference between the liquidation amount and borrower balance (i.e., any remaining amount of the liquidation amount) can be transferred to the borrower device 930 (or a designated address) at 994.

At 998, obligation object 916 may set a parameter indicating the last check time of the obligation object, to the current time.

Although certain of the embodiments have been described herein as involving an obligation object and a separate wrapper contract, in some other embodiments, the functions of the obligation object and wrapper contract may be merged. That is, the obligation object may be configured to directly perform certain of the functions described herein as carried out by the wrapper contract, whereas certain other functions of the wrapper contract may be modified or unnecessary when the wrapper functionality is incorporated into the obligation object.

The present invention has been described here by way of example only, while numerous specific details are set forth herein in order to provide a thorough understanding of the exemplary embodiments described herein. However, it will be understood by those of ordinary skill in the art these embodiments may, in some cases, be practiced without these specific details. In other instances, well-known methods, procedures and components have not been described in detail so as not to obscure the description of the embodiments. Various modifications and variations may be made to these exemplary embodiments without departing from the spirit and scope of the invention, which is limited only by the appended claims.

The invention claimed is:

1. A method for automatically conducting a continuous forward rate agreement in a cryptocurrency using smart contracts, the smart contracts implemented by a plurality of nodes of a distributed ledger system, wherein each of the plurality of nodes is a computing device comprising at least one processor, the method comprising:

each of the plurality of nodes identifying a first cryptographically-derived address for accessing a first smart contract, controlled by a first autonomous Contract Account of the distributed ledger system, the first smart contract having a first cryptographically-derived borrower address associated therewith, the first smart contract having (i) a owed amount value initially based on an amount of cryptocurrency transferred to the first cryptographically-derived borrower address, (ii) a collateral value representing a value of a collateral object committed to the smart contract associated with the first cryptographically-derived borrower address, (iii) an interest rate query routine that periodically determines a first variable interest rate based at least on an extrinsic rate or an intrinsic rate;

each of the plurality of nodes identifying a second cryptographically-derived address for accessing a second smart contract, controlled by a second autonomous Contract Account of the distributed ledger system, the second smart contract having a first cryptographically-derived lender address associated therewith, the second smart contract having (i) a lender balance representing a lender amount of cryptocurrency associated with the first cryptographically-derived lender address, and (ii) a second interest rate query routine that periodically determines a second variable interest rate based at least on the extrinsic rate or the intrinsic rate;

each of the plurality of nodes deploying an obligation object, wherein the obligation object is a smart contract controlled by a third autonomous Contract Account of the distributed ledger system, and wherein deploying the obligation object comprises:
- receiving a deploy request transaction from an Externally Owned Account;
- creating the obligation object and determining a cryptographically-derived address for accessing the obligation object;
- the obligation object querying the first smart contract at the first cryptographically-derived address to determine the collateral value;
- the obligation object updating an internal state to reflect the collateral value in association with the first cryptographically-derived borrower address;
- the obligation object querying the second smart contract at the second cryptographically-derived address to determine the lender balance;
- the obligation object updating the internal state to reflect lender balance in association with the first cryptographically-derived lender address; and
- the obligation object determining a predetermined interest rate associated with the obligation object; and each of the plurality of nodes executing the obligation object, wherein executing the obligation object comprises:
- the obligation object receiving at least one first payment transaction associated with the first cryptographically-derived borrower address;
- the obligation object receiving at least one second payment transaction associated with the first cryptographically-derived lender address;
- the obligation object updating the internal state to update the borrower balance based on the at least one first payment transaction and the at least one second payment transaction;
- detecting a triggering event; and
- in response to detection of the triggering event, the obligation object executing a subroutine comprising:
  - computing a lender return amount based on the lender balance in the internal state;
  - computing a borrower return amount based on the borrower balance in the internal state; and
  - sending, to the distributed ledger system, a cryptographically-signed transaction that is cryptographically-signed using a private key of the obligation object, the cryptographically-signed transaction releasing a cryptocurrency based on the lender return amount and the borrower return amount.

2. The method of claim 1, wherein the lender amount is re-allocated by the obligation object between the first cryptographically-derived lender address and a second cryptographically-derived lender address according to a transaction cryptographically-signed by the first and the second cryptographically-derived lender addresses, respectively.

3. The method of claim 2, wherein executing the obligation object further comprises:
- the obligation object updating the internal state to reduce the lender return amount associated with the first cryptographically-derived lender address;
- the obligation object sending a return transaction cryptographically-signed using a private key of the obligation object, releasing a subset of the lender return amount to a wallet at the first cryptographically-derived lender address; and
  - the obligation object receiving a secondary loan amount to replace the subset of the lender return amount, in a replacement transaction cryptographically signed by the second cryptographically-derived lender address.

4. The method of claim 1, wherein the borrower balance is re-allocated by the obligation object between the first cryptographically-derived borrower address and a second cryptographically-derived borrower address according to a transaction cryptographically-signed by the first and second borrower cryptographically-derived addresses, respectively.

5. The method of claim 4, wherein executing the obligation object further comprises the obligation object updating the internal state to reduce the borrower return amount associated with the first cryptographically-derived borrower address.

6. The method of claim 1, wherein creating the obligation object further comprises querying an external server or smart contract to determine the predetermined interest rate.

7. The method of claim 1, wherein the predetermined interest rate is fixed.

8. The method of claim 1, wherein executing the obligation object further comprises:
- determining that the extrinsic rate has decreased relative to the predetermined interest rate; and
- increasing a proportion of the lender return amount to be allocated to the first cryptographically-derived lender address, based on the difference between the extrinsic rate and the predetermined interest rate.

9. The method of claim 8, wherein increasing the proportion of the lender return amount to be allocated to the first cryptographically-derived lender address further comprises:
- computing the proportion of the lender return amount;
- invoking a partial liquidation function of the obligation object; and
- receiving the proportion of the lender return amount in an escrow account.

10. The method of claim 1, wherein executing the obligation object further comprises:
- determining that the extrinsic rate has increased relative to the predetermined interest rate; and
- increasing a proportion of the lender return amount to be allocated to the first cryptographically-derived borrower address, based on the difference between the extrinsic rate and the predetermined interest rate.

11. The method of claim 10, further comprising transferring a portion of the lender return amount to the first smart contract to reduce the owed amount value.

12. The method of claim 1, wherein detecting the triggering event comprises detecting that the collateral value is lower than the lender return amount.

13. The method of claim 1, wherein detecting the triggering event comprises detecting that a term of the obligation object has elapsed.

14. The method of claim 1, wherein the at least one first payment transaction is at least one borrower interest payment based on the first variable interest rate.

15. The method of claim 1, wherein the at least one second payment transaction is at least one lender interest payment based on the second variable interest rate.

16. The method of claim 1, wherein the at least one first payment transaction comprises a plurality of payments.

17. The method of claim 1, wherein the cryptocurrency is based on a form of Dai.

18. The method of claim 17, wherein the extrinsic rate is a Dai Savings Rate.

19. The method of claim 17, wherein the extrinsic rate is based on a dividend rate.

20. The method of claim 1, further comprising each of the plurality of nodes confirming a current state of the distributed ledger system in response to execution of the obligation object.

21. A non-transitory computer readable medium storing computer program code executable by a processor of at least one node of a distributed ledger system, the computer program code, when executed by the processor, causing the processor to perform steps for automatically conducting a continuous forward rate agreement in a cryptocurrency using smart contracts, the steps comprising:

identifying a first cryptographically-derived address for accessing a first smart contract, controlled by a first autonomous Contract Account of the distributed ledger system, the first smart contract having a first cryptographically-derived a first borrower address associated therewith, the first smart contract having (i) a owed amount value initially based on an amount of cryptocurrency transferred to the first cryptographically-derived borrower address, (ii) a collateral value representing a value of a collateral object committed to the smart contract associated with the first cryptographically-derived borrower address, (iii) an interest rate query routine that periodically determines a first variable interest rate based at least on an extrinsic rate or an intrinsic rate;

identifying a second cryptographically-derived address for accessing a second smart contract, controlled by a second autonomous Contract Account of the distributed ledger system, the second smart contract having a first cryptographically-derived lender address associated therewith, the second smart contract having (i) a lender balance representing a lender amount of cryptocurrency associated with the first cryptographically-derived lender address, and (ii) a second interest rate query routine that periodically determines a second variable interest rate based at least on the extrinsic rate or the intrinsic rate;

deploying an obligation object, wherein the obligation object is a smart contract controlled by a third autonomous Contract Account of the distributed ledger system, and wherein deploying the obligation object comprises:

receiving a deploy request transaction from an Externally Owned Account;

creating the obligation object and determining a cryptographically-derived address for accessing the obligation object;

the obligation object querying the first smart contract at the first cryptographically-derived address to determine the collateral value;

the obligation object updating an internal state to reflect on the collateral value in association with the first cryptographically-derived borrower address;

the obligation object querying the second smart contract at the second cryptographically-derived address to determine the lender balance;

the obligation object updating the internal state to reflect lender balance in association with the first cryptographically-derived lender address; and the obligation object determining a predetermined interest rate associated with the obligation object; and executing the obligation object, wherein executing the obligation object comprises:

the obligation object receiving at least one first payment transaction associated with the first cryptographically-derived borrower address;

the obligation object receiving at least one second payment transaction associated with the first cryptographically-derived lender address;

the obligation object updating the internal state to update the borrower balance based on the at least one first payment transaction and the at least one second payment transaction;

detecting a triggering event; and in response to detection of the triggering event, the obligation object executing a subroutine comprising:

computing a lender return amount based on the lender balance in the internal state;

computing a borrower return amount based on the borrower balance in the internal state; and sending, to the distributed ledger system, a cryptographically-signed transaction that is cryptographically-signed using a private key of the obligation object, the cryptographically-signed transaction releasing a cryptocurrency based on the lender return amount and the borrower return amount.

* * * * *